US012314763B2

(12) United States Patent
Guha

(10) Patent No.: US 12,314,763 B2
(45) Date of Patent: May 27, 2025

(54) MANAGING RESOURCES OF A SYSTEM BASED ON HARDWARE TRANSACTIONAL MEMORY

(71) Applicant: B Q T Technologies, Dubai (AE)

(72) Inventor: Dipnarayan Guha, Victoria (AU)

(73) Assignee: ENSO TECHNOLOGY LAB L.L.C, Dubai (AE)

( * ) Notice: Subject to any disclaimer, the term of this patent is extended or adjusted under 35 U.S.C. 154(b) by 0 days.

(21) Appl. No.: 18/525,748

(22) Filed: Nov. 30, 2023

(65) Prior Publication Data

US 2024/0411596 A1      Dec. 12, 2024

Related U.S. Application Data

(63) Continuation of application No. 18/207,664, filed on Jun. 8, 2023, now Pat. No. 11,875,186.

(51) Int. Cl.
    *G06F 9/50* (2006.01)
(52) U.S. Cl.
    CPC .................. *G06F 9/5016* (2013.01)

(58) Field of Classification Search
    CPC ...................................... G06F 9/5016
    See application file for complete search history.

(56) References Cited

U.S. PATENT DOCUMENTS

| 2021/0019190 A1* | 1/2021 | Punadikar ............ G06F 9/4881 |
| 2023/0017844 A1  | 1/2023 | Gan et al. |

* cited by examiner

*Primary Examiner* — Charlie Sun
(74) *Attorney, Agent, or Firm* — Fenwick & West LLP

(57) ABSTRACT

A system manages resources based on a hardware transactional memory unit. The system stores a system profile map comprising system profiles of applications. The system profile of an application stores information describing system resource utilization of the application. If a request for resources for executing a new application is received, a hardware transactional memory unit determines an amount of memory to be allocated for executing the new application and allocates memory partitions for executing the new application. The system profile of the new application is compared with system profiles in the system profile map. If there are any indicators of compromise representing potential compromise of the new application the request for resources for the new application is denied. The system generates and uses true random numbers.

20 Claims, 19 Drawing Sheets

MANAGING RESOURCES OF A SYSTEM BASED ON HARDWARE TRANSACTIONAL MEMORY

CROSS REFERENCE TO RELATED APPLICATIONS

This application is a continuation of co-pending U.S. application Ser. No. 18/207,664, filed Jun. 8, 2023, which is incorporated by reference in its entirety.

BACKGROUND

Field of Art

This disclosure relates in general to managing system resources of an information technology infrastructure and more specifically to securely managing system resources using hardware transactional memory.

Description of the Related Art

Organizations have been maintaining increasingly complex IT (information technology) infrastructure to support the various needs of the organization. With increase in the sophistication of IT infrastructure of organizations there has been increase in types of cyber security attacks that seek to compromise the IT infrastructure of organizations. For example, computer viruses have become more sophisticated and have potential to cause increasing amount of damage to the IT infrastructure. Various techniques are used to detect and mitigate effects of such cyber security threats. For example, some anti-virus technology identifies known signatures of viruses and analyzes software to determine whether the signatures of known viruses occur in the software. However malicious actors continue to develop new viruses that do not match any known signatures and are therefore difficult to detect. If an organization fails to protect its IT infrastructure against such cybersecurity threats, the organization may suffer significant loss of data, damage to IT infrastructure such as software programs, and so on.

SUMMARY

A system manages resources based on a hardware transactional memory unit. The system stores a system profile map storing system profiles of applications executing one or more computing system units. The system profile of a particular application stores information describing system resource utilization of the particular application. A request for resources for executing a new application is received. A hardware transactional memory unit determines an amount of memory to be allocated for executing the new application. The hardware transactional memory unit allocates a set of memory partitions for use for executing the new application. A system profile representing execution of the new application is determined. The system profile of the new application is compared with system profiles in the system profile map. Based on the comparison the system determines whether there are any indicators of compromise representing potential compromise of the new application. If there is at least an indicator of compromise for the new application the request for resources for the new application is denied. The system may further kill all processes created for the new application.

If no indicators of compromise representing potential compromise of the new application are detected, the request for resources for the new application is approved and the new application is executed.

According to an embodiment, the system uses learning to protect an IT infrastructure. The system receives a request for execution of an application on one or more computing systems. The system generates a process graph for the application based on an execution of the application. The system accesses a system profile map storing characteristics of applications known to be uncompromised. The system compares characteristics of the process graph of the application with characteristics of the process graph of a matching uncompromised application in the system profile map. The system determines based on the comparison, that there are differences in the characteristics of the process graph of the application with characteristics of the process graph of a matching uncompromised application. Responsive to identifying differences in characteristics of the process graph of the application with characteristics of the process graph of a matching uncompromised application, the system identifies the application as a compromised application. A learning unit stores information describing the differences in characteristics of the process graph of the application with characteristics of the process graph of a matching uncompromised application. The system using the stored differences in characteristics for subsequently identifying compromised applications.

The system according to an embodiment, provides a service that generates true random numbers. The system stores a plurality of policies in a policy database. A policy identifies a set of component units from one or more computer systems. Each component unit generates data values used for generating seed values for generating random numbers. For example, a computing unit may represent a CPU and the data values generated by the component may be CPU usage; a component may be memory of a system and the data values generated by the component may be memory utilization. The system selects a policy identifying a set of component units from the policy database. The system generates a set of seed values based on the policy by performing the following steps. The system receives data values generated by each of the set of component units. The system combines the data values received from the set of component units to generate a seed value. The system uses the seed value to generate random numbers. The system determines a randomness quality score of seed values generated using the policy. The randomness quality score is determined based on one or more statistical properties associated with the set of seed values. If the system determines that the randomness quality score of seed values generated using the policy indicates a quality that is below a threshold value, the system selects a different policy from the policy database.

According to an embodiment, a policy further specifies operators for transforming data values generated by the component units, permutations of the data values, expressions for combining data values to generate seed values and so on.

According to an embodiment, the system generates new policies by modifying existing policies and also removes policies that are determines to have a low randomness quality score.

Embodiments of the invention include computer-implemented methods representing processes disclosed herein. Embodiments of the invention include non-transitory computer readable storage mediums storing instructions that when executed by one or more computer processors cause the one or more computer processors to perform steps of the methods disclosed herein. Embodiments of the invention include computer systems comprising one or more computer processors and non-transitory computer readable storage mediums storing instructions that when executed by the one or more computer processors cause the one or more computer processors to perform steps of the methods disclosed herein.

Figure 1:
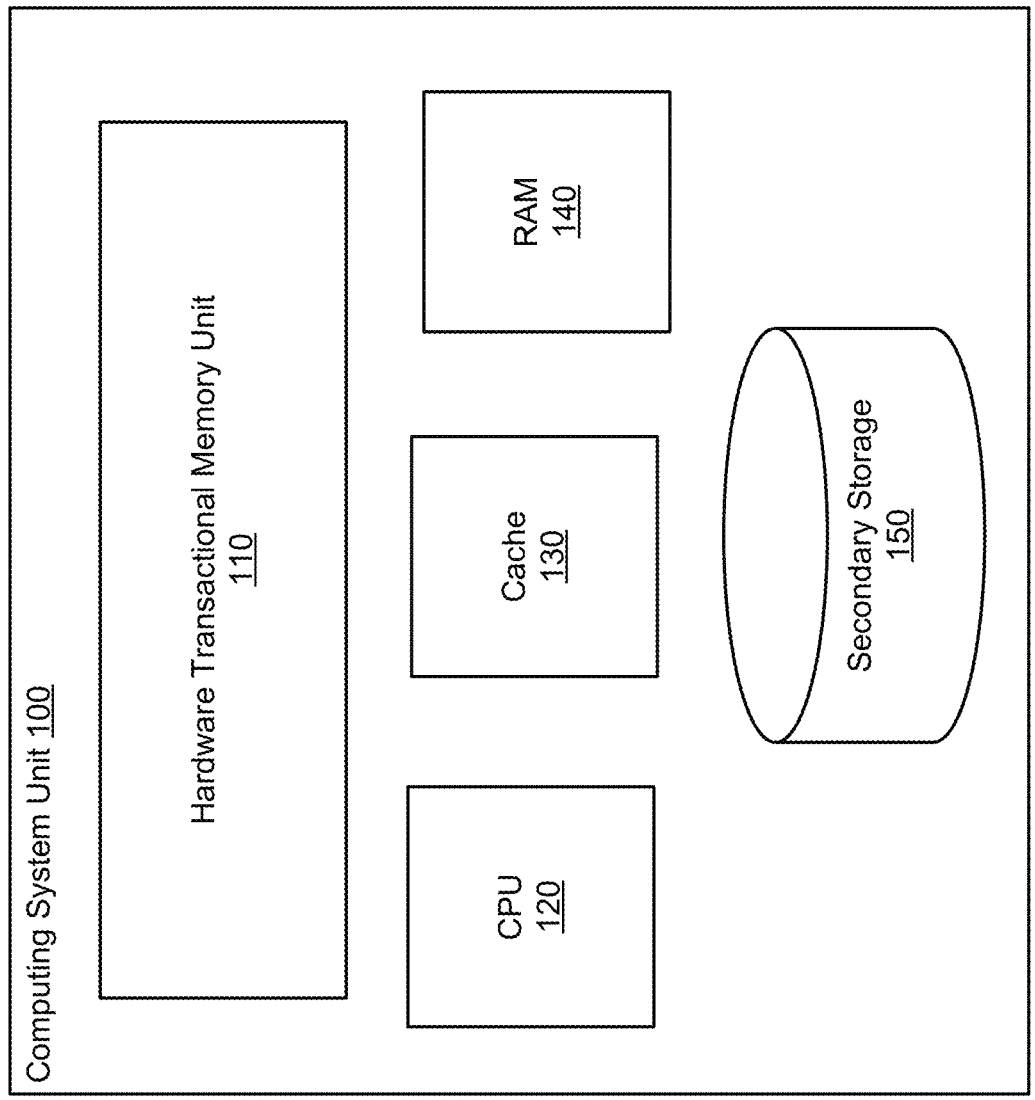
FIG. 1 is a block diagram of a computing system base unit including a hardware transaction memory, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Organizational IT infrastructure is protected against different types of cybersecurity attacks using a suite of different tools. Such tools can be both hardware and software based. Different applications run on various components of the IT infrastructure (e.g., a Windows Server 2019 running SharePoint, a Red Hat Enterprise Linux server running Oracle Financials ERP, a workstation running Office 365 Desktop Apps, an iPad running Salesforce Lightning etc.). System resources for these applications are managed by the operating system (OS) in conjunction with the underlying hardware on which these applications run. At steady state, a set of applications run on the system, the resources needed for those applications to be run being allocated by the OS and the associated system hardware (e.g., CPU and memory unit). Read/write operations are carried out in sequence on the basis of system calls managed by the OS, which in turn, generate relevant bit-level instructions to be executed at the CPU and memory unit levels in hardware.

System Environment and Architecture

FIG. 1 is a block diagram of a computing system base unit including a hardware transaction memory, according to an embodiment. The computing systems unit 100 includes a hardware transactional memory unit 110, a CPU (central processing unit) 120, a cache 130, a RAM (random access memory) 140, and a secondary storage 150. Other embodiments of the computing systems unit 100 may include more or fewer components. The computing systems unit 100 may also be referred to herein as a computing systems base (CSB) unit, a computing system, or a system. The computing systems unit 100 may include other components not shown in FIG. 1, for example, other types of data stores, and so on.

A system profile map is generated for each running application by collecting information about the system calls made by the application and bit-level instructions in terms of system resource statistics (e.g., memory addresses, CPU resources used etc.), processes, threads, and tasks. The system profile map stores information describing the state of the system that runs the applications. The system profile map is used to determine a set of system resource dependencies that are associated with trusted applications. The system determines whether an application can be trusted at the time of processing request by the OS based on computation of digital signatures. Once this digital signature is verified to be correct, resources are allocated by the OS to facilitate the application to run. This digital signature may be applied for each application running in the system profile map. At steady state, these digital signatures are collected and included in the system profile map.

The system profile map is used to establish the basis of system security for the group of trusted applications running by classifying system resource statistics; information on processes, threads, and tasks; and digital signatures against each application-invoked program. For each application that is identified as trusted, the steady state system resource dependencies are associated and continually observed. System resource dependencies may overlap across applications. For example, more than one application thread can have the same scheduling priority. The steady state system resource dependencies for running application programs can be extended similarly by collecting the same information for different types of memory architectures and system resource management models such as virtual machines, containers, shared-memory systems, hybrid memory systems etc.

At steady state, the system profile map indicates how system resources are managed with respect to the running applications. As more and more applications request to be executed, resources keep getting allocated up to a limit of hardware processing support available. The operating system may deploy various techniques, hardware or hybrid OS-hardware level to optimize system resource allocation. Concurrency in program code execution, derived from one or more of the applications, may be limited to providing system resources for new application requests on a best effort basis.

It is challenging to check how secure an application is at the time its request for processing arrives. This can potentially cause security breaches, especially for applications/programs that are associated with trusted applications. For example, a secure PDF file may include an embedded code snippet which executes only at the time the PDF file is open, and then disappears after the PDF file is closed. The digital signature of the PDF identification by the OS remains valid as the signature does not include the content check within the PDF file, and thus, the OS does not detect any anomaly. As another example, a referenced code snippet may occur in a secure PDF file that is received via email. Once this PDF file is clicked open, the code snippet creates a new process to run a differential program at the time the OS is allocating system resources for the opened PDF file to display on the screen. This in turn creates further processes and affects the other system resource dependencies of existing running applications, effectively taking over the system and invoking admin-level control.

The system according to an embodiment, performs checks prior to allocating system resources to a requesting application to determine presence of threat actors. The system detects unauthorized intrusion associated with trusted applications that have been cleared by the OS and underlying hardware to run. The system performs checks prior to allocating system resources to a requesting application. The system is security-aware at the OS and hardware levels while allocating system resources to applications at run-time.

The computing systems unit 100 includes a hardware transactional memory unit 110 that may be implemented as a component of the on-chip hardware blocks or implemented as a hardware-software solution using the OS (operating system) kernel space. The OS APIs invoke the kernel space. The hardware transactional memory unit can also be implemented wholly within the CPU or the cache, with its constituent components either implemented as on-chip memory blocks or cache memory units. The hardware transactional memory unit 110 may be implemented as a component separate from the computing systems unit 100.

Typically, transactional memory is implemented in developer code sections that need to be isolated from one another, which is identified as areas in the lines of code by the developer directly. The run-time system for this code determines an optimal concurrency technique. Transactional memory can be used to remove the need for global locks and can also remove the need for lock analysis that is required to implement fine-grained locks—which is typically required when threads run similar code but may not access the same memory location. The transaction can be set around critical code sections in an application program, which either allows the full section of the critical code to complete or retains the full context of the start of the transaction to enable the transaction to re-execute.

Hardware transactional memory (HTM) may be implemented by supporting hardware extensions to memory accesses and code executions around the areas specified by the developer. HTM is typically implemented on a best effort basis. Depending on the underlying hardware architecture, HTM is implemented on the system cache memory. The system according to various embodiments implements HTM that include policy-based implementations derived from application programs at run-time, as well as policy-based implementations derived from system profile map changes at run-time.

Figure 2:
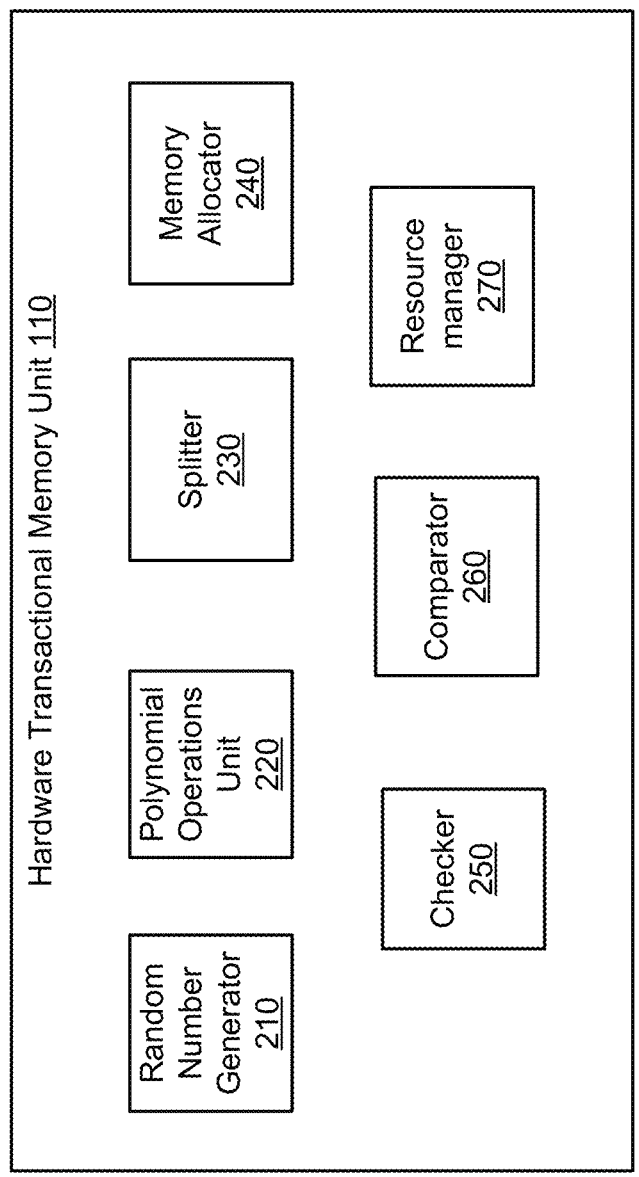
FIG. 2 shows the system architecture of a hardware transactional memory unit according to an embodiment.

FIG. 2 shows the system architecture of a hardware transactional memory unit according to an embodiment. The hardware transactional memory unit 110 comprises sub-units that include a RNG (random number generator) 210, a polynomial operations unit 220, a splitter 230, a memory allocator 240, a checker 250, a comparator 260 and a resource manager 270.

Figure 3:
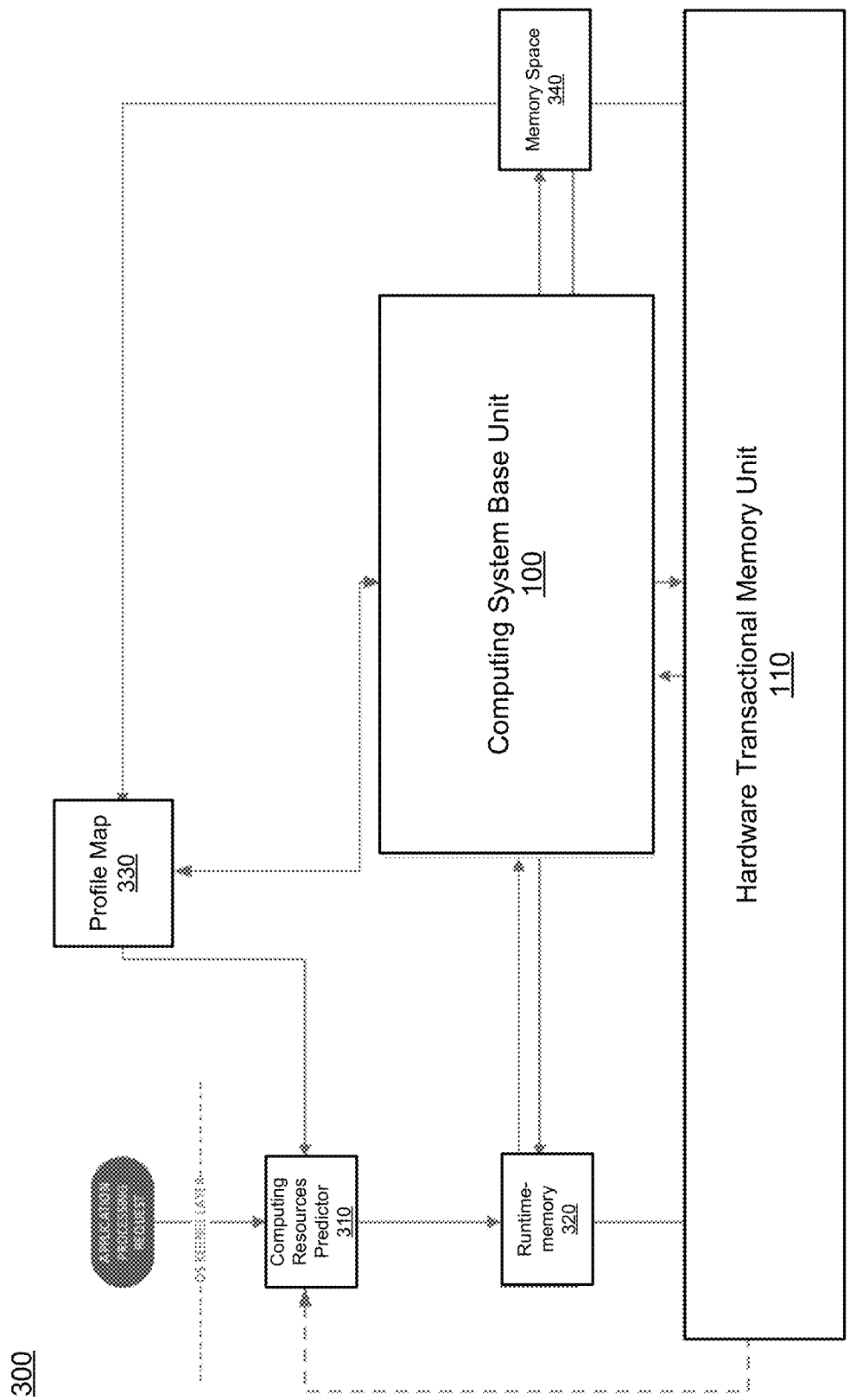
FIG. 3 shows the system architecture of a system for securely managing application processing requests according to an embodiment.

FIG. 3 shows the system architecture of a system for securely managing application processing requests according to an embodiment. The system 300 includes a computing resources predictor 310, a run-time memory 320, memory profiles of processes 330, memory space 340, one or more computing systems units 100, and hardware transactional memory unit 110. The system 300 runs multiple applications on different types of target hardware and software systems.

The random number generator 210 has a dual interface with a computing resources predictor shown in FIG. 3. The hardware transactional memory unit 110 may be part of or interface with the computing systems unit 100. The memory space 340 is typically implemented through one or more combinations of memory units in CPU, cache, RAM, and secondary storage. The hardware transactional memory unit 110 also interfaces with the run-time memory 320 and the memory space 340. The profile map 330 stores run-time memory profiles of global logical processors and memory. The profile map 330 is implemented with the system profiles for each running application in the form of a kernel space code script that runs on the OS. The profile map 330 interfaces with the computing resources predictor 310, the computing systems unit 100, and the memory space 340.

At steady state, assume that the system profile map is SP1 for a set of applications running {Ai}. Then SP1={{System resource statistics SRTi}, {Processes Pi}, {Threads Ti}, {Tasks Ki), {Digital Signatures Si} }. Accordingly, the system profile map includes data structure that store system resource statistics, information describing processes, threads, tasks, and digital signatures of the applications. The kernel space code script implements a function F1 on the system profile map SP1, which references Ai's associated data structures SRTi, Pi, Ti, Ki, Si. The function F1 may be executed continuously in the kernel space of the OS and can be interfaced with different hardware blocks or user space code or application-level code or OS Application Programming Interfaces (APIs) for resource management.

Figure 4:
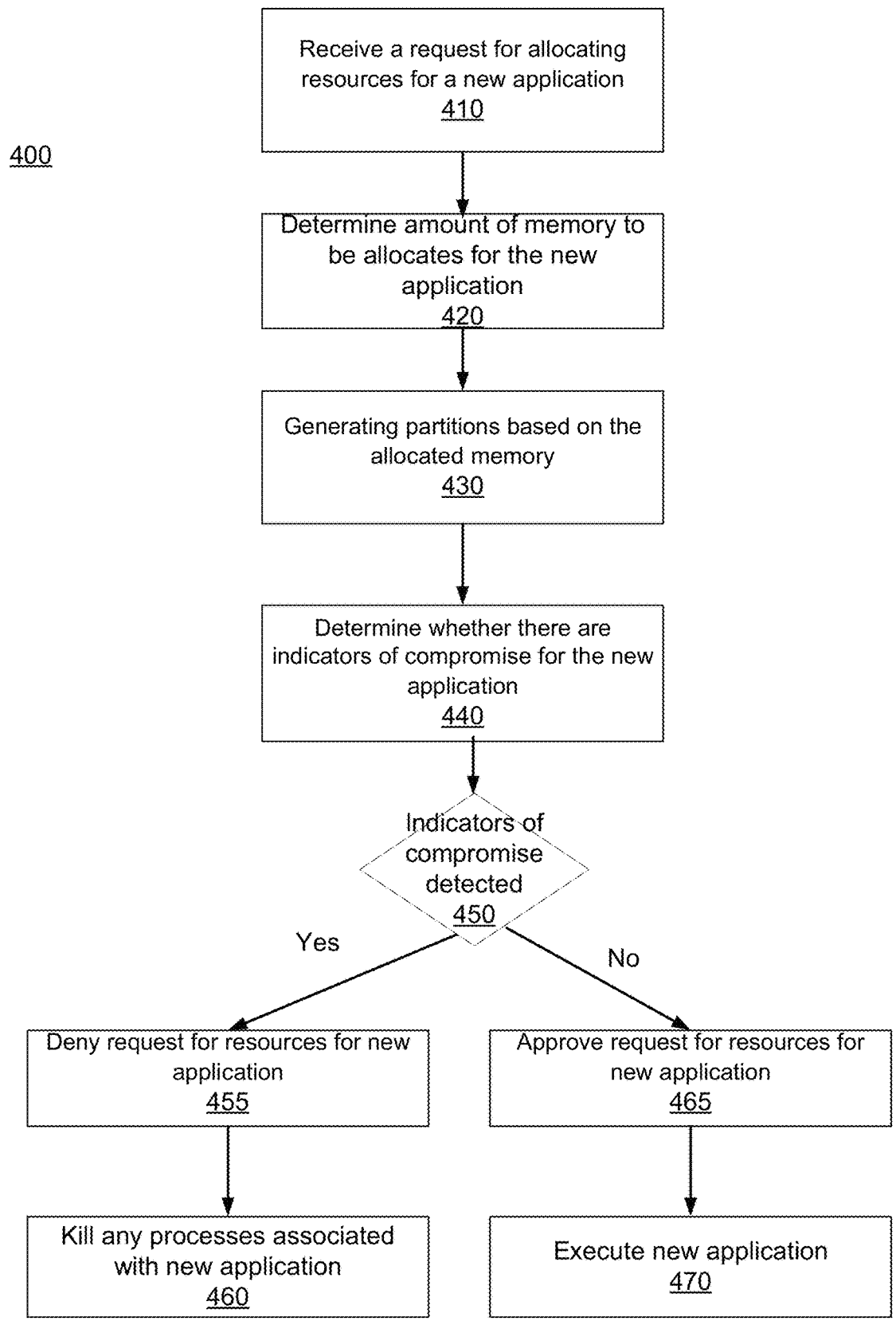
FIG. 4 shows the process of allocating resources for a new application according to an embodiment.

FIG. 4 shows the process of allocating resources for a new application according to an embodiment. At time (t=0), the system receives 410 a request for resources for executing a new application A'. The system determines 420 an amount of memory to be allocated for the new application. According to an embodiment, the computing resources predictor 310 communicates this request to the random number generator 210 of the hardware transactional memory unit. The random number generator 210 outputs one or more types of random data that is derived from multiple entropy-generating sources within the system (e.g., CPU and hardware interconnect voltages at any given point in time, output of a particular on-chip register, number of system calls at any given point in time etc.). The output of this random number generator 210 serves two purposes: a) It provides an initial indicative estimate of the amount of resources required by the new application to run; b) it creates a map of addresses within system memory from where the estimated amount of resources may be allocated for the new application to run. The computing resources predictor 310 receives the initial indicative estimate from the random number generator 210 and based on the information it references from the system profile map SP1, it estimates whether this initial indicative estimate is correct to satisfy the requirements of application A'. If not, the computing resources predictor 310 communicates to the random number generator 210 to provide another random number till the estimated amount is deemed to be reasonably correct. In some embodiments, the computing resources predictor 310 directly predicts the amount of resources needed for the new application, for example, based on historical data for similar applications.

According to an embodiment, when a new application request comes in, the system (e.g., implemented using the OS) first determines the requesting application type (for example, depending on the file extension of the executable file of the application). The system then determines whether this file type has a corresponding application executable program available in the system, and if it has, the system identifies that application executable program (as an example, if the requesting application type has a .pdf file extension, the system will determine if Adobe Reader is installed on the system which opens this file type). Once this initial determination has been done by the system, as shown in FIG. 3, the resulting information is passed on to the computing resources predictor. The OS now determines arbitrarily how much dynamic memory size this requesting application might need and passes this information to the random number generator. The random number generator, based on its knowledge of the system at run-time (from its connections with the profile map through the HTMU), determines how this estimated dynamic memory size may be provided to the computing resources predictor. The system generates random numbers to determine arbitrary partitions of dynamic memory size requested and determines where in the memory space these may be assigned. The number of partitions can be arbitrary, depending on how the HTMU manages the overall run-time memory allocations of already executing applications and new requesting applications. At this stage, the estimated dynamic memory size for the requesting application is fixed, and the request starts being processed. At any point in time, if there's any deviation in the way how the process graph is mapped at run-time, the system determines that the requesting application is compromised. As soon as this determination happens, the system invokes isolating the requested application and killing the corresponding process, informing the computing resources predictor through the random number generator hat the requesting application is compromised. There may not be any actual physical dynamic memory allocated to the requesting application, as a result of which, this compromised application is denied the physical resources to run automatically at the time when it makes the request to the system. The deviation of the process graph can happen at any stage—at the process level, at the task level, at the thread level or at the hardware level—or a combination of one or more levels. The system is based on how the HTMU is designed and implemented and is guaranteed to identify this deviation correctly and generate corresponding hardware-level flags (and/or hardware-OS level messages) that identify the compromise in the requested application at run-time. So, until the complete process graph has been traversed, and no deviation noted, the system does not allocate physical resources to the application for it to run. Also, there can be multiple iterations between the computing systems predictor and the random number generator at the time when dynamic memory size is being considered for allocation. If the random number generator determines that there are not enough partitions to support the dynamic memory size allocation in the memory space, it can respond with a flag to the computing systems predictor. In this case, depending on how the HTMU is managing applications, there could be a wait in the requesting application, or the computing systems predictor may initiate another dynamic memory size estimation. This can be implemented specifically to the OS and the underlying hardware.

The system generates 430 memory partitions based on the initial estimate determined. The computing resources predictor 310 sends a flag to the random number generator 210, and another flag to the run-time memory 320, writing these 2 flags in sequence into the OS-hardware message interface, indicating that a new application is about to be processed. Writing these 2 flags in sequence invokes a read operation by the CPU and the run-time memory 320, whereby references of SP1 (the system memory map) are accessed. The read operation output is communicated to the random number generator 210, which it uses to create the map of addresses within system memory from where the estimated amount of resources may be allocated to the new application A' to run. The random number generator 210 communicates this to the splitter 230, which splits the number of blocks associated with the address maps into multiple partitions, for example, an arbitrary number of partitions. Each partition is allocated to a memory address in the memory allocator 240, following which the integrity of the partitioned data is checked in the checker 250. Typically, when an application request is received by the system, the OS determines the application type, the related trusted program in the system associated with the application type and whether there is enough dynamic memory for it to run on the system. The system analyzes run-time behavior of trusted applications and also the sequences followed till such trusted applications are actually assigned physical resources by the system to run. Up until this resource assignment happens, the requesting application may not receive the resources to run. But if this resource assignment happens, then for that requesting application, the corresponding system profile map is generated and added to the profile map database. This database entry is also timestamped. FIG. 12B highlights how from an application, processes, tasks, threads and hardware instructions are sequenced from a top-down approach.

The comparator 260 implements a set of programs to identify different indicators of compromise (IoC). The system may implements techniques that are targeted at identifying deviations in the run-time process graph traversals such as new process creation, administrative privilege alteration and memory write requests. These programs are applied onto the partitioned data outputted from the checker 250. Based on the system memory map SP1 corresponding to the already running trusted applications {Ai}, if there are any deviations in the system resource dependencies observed in the comparator 260, the requests for resources for the new application is denied 445. A flag is generated to the resource manager 270. Typically, an uncompromised application will have a specific type of process graph, as well as a system resource dependency map in terms of processes, tasks and threads. The run-time behavior of this uncompromised application will have a definitive sequence of process graph traversal, e.g., it is known what processes are created in what sequence, what system calls are generated in what sequence and what dynamic memory write instructions are involved in what sequence. If the application is compromised, there will be a variation in one or more elements of this sequence of process graph traversal. For example, there could be a new process creation request that comes up at run-time, or there's an extra memory write instruction that is involved. This constitutes a deviation and results in the identification of the compromise. For the IoCs implemented based on the MITRE ATT@CK Framework, the variation elements can be programmed depending on the type of threat behavior, and kernel scripts implemented with these programs to detect the variations. A flag is also written in the thread scheduler of the OS and the CPU of the computing systems unit 100. This indicates that there is a compromise in the requesting new application A'. The resource manager 270 will write a flag in the OS-hardware message interface to this effect, which is written in the memory space 340. The memory space 340 generates a flag to the kernel space code running the system memory map SP1, and a flag to the CPU, with an indicator to kill 460 the process associated with the requested application A'. The CPU kills the process, preventing any system resources to be granted to the requesting new application A', thereby denying it to run, and isolating the request and its associated data structures from existing data structures associated with the application set Ai. This prevents a compromised application to run by denying it the resources that it needs to run. At the same time, it's also ensured that the compromised application cannot affect any of the existing trusted applications' data structures at the system level and cannot take control of the system and/or influence its functioning that is different from what has been the case as described in the steady state system profile SP1.

The system is able to identify possible compromises for both new applications as well as existing applications that are already running and requesting resources, as typically happens in virtual machines, or shared memory architecture systems. The HTMU guarantees that run-time behavior of applications in terms of resource requests is always handled through process graph traversal, thereby ensuring that any deviations from the uncompromised version of the corresponding application is picked up at the resource request time. Also, in cases where an application may clone itself, or change its form into another application type, the HTMU guarantees any deviation identification at run-time. Existing applications, which were not compromised at the time of its initial request, are allowed to run as usual. However if there's a compromise introduced through them at some point in time (e.g., a streaming application from a remote source which is trusted, and contains some compromise in embedded content), the application is isolated and handled by the HTMU in accordance with embodiments of this invention.

If there is no detected deviation of system resource dependencies observed in the comparator 260, the request for resources for the new application is approved 465 and the new application executed 470. A new flag is written in the thread scheduler of the OS and the CPU of the computing systems unit 100, and a new flag is read from the comparator 260 that indicates zero deviation. The output is then communicated to the resource manager 270, which then writes the corresponding resource fulfilment information to the memory space 340, which communicates the same with the CPU of the computing systems unit 100. Once the resource fulfilment information is written to the memory space 340, the output flag is communicated to the system memory map of the kernel space code. The system memory map is accordingly updated, with the new application A' being added to the list of existing running applications {Ai}. Through the hardware transactional memory unit 110 thus, concurrency is achieved both for new application runs, as well as for compromised application requests—making sure that a compromised application cannot run in the first place by denying it the system resources necessary to run. The random number generator 210 and the splitter 230 always ensure that the number of partitioned blocks with respect to the amount of system resources required for a new application is available, provided the application otherwise is not compromised. However, if there is a compromise, the requesting application would not be able to obtain resources for running.

The hardware transactional memory unit 110 and its associated techniques as described here overcome the challenges of best effort basis while achieving concurrency and optimization of resources at run-time. Developers are free to write application code without specifically worrying about code area isolation and doing lock analysis, in which case the system 300 guarantees the availability of resources for concurrent, highly parallelized and secure partitioned runs at all times. The system 300 also takes into consideration policy-based implementations derived from application programs at run-time though the comparator 260 and policy-based implementations derived from system profile map changes at run-time though the resource manager 270.

Policy-based implementations are based on optimizing dynamic memory space for run-time resources for concurrent program execution. Information of the system profile maps are continuously read to program hardware support extensions in real-time so that the OS-hardware level messages can be inputted into the policy-based implementation framework. The hardware support extensions span over cache, CPU, RAM and the overall instruction set architecture that varies over time based on the system state and the type and number of applications running on the system at any time.

Figure 5:
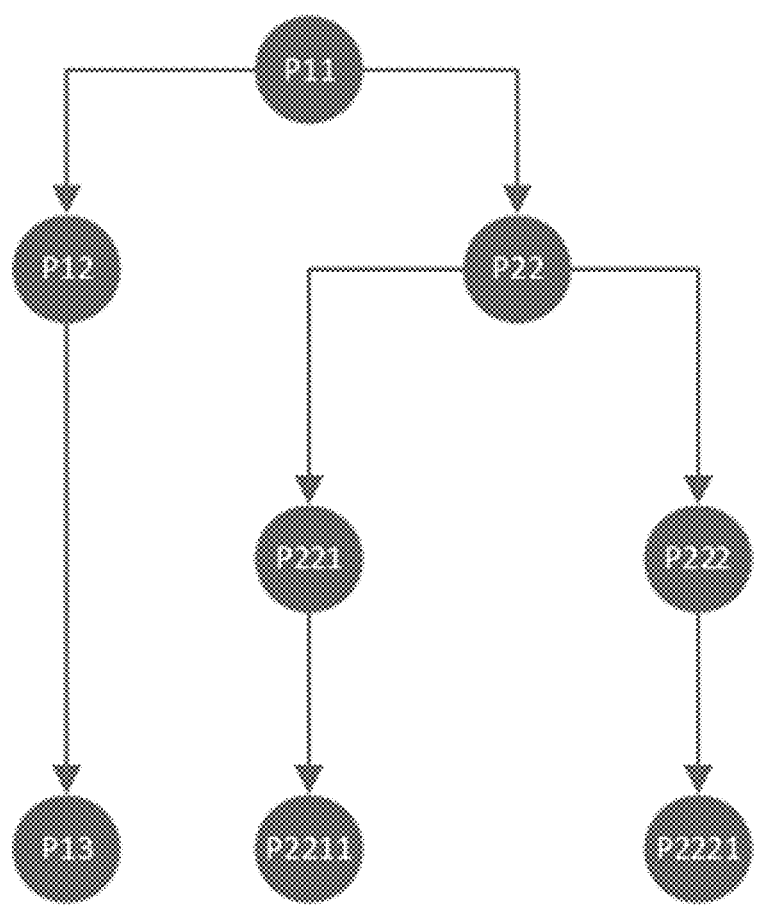
FIG. 5 illustrates a process graph obtained from an application at run-time according to an embodiment.
Figure 6:
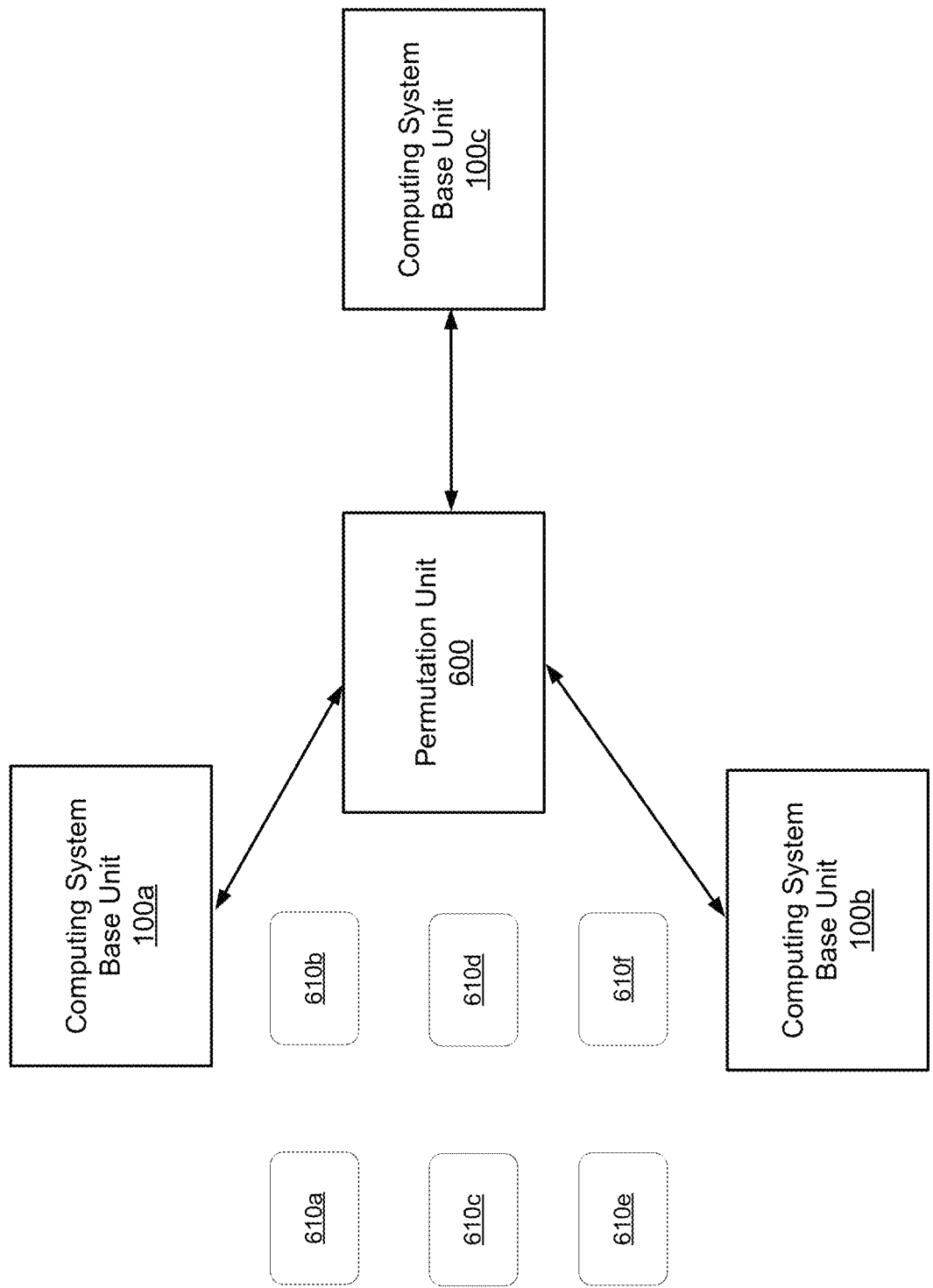
FIG. 6 illustrates a permutation unit interacting with multiple computing systems units, according to an embodiment.

FIG. 5 illustrates a process graph obtained from an application at run-time according to an embodiment. An application at run-time can be broken down into several processes, which can again further be broken down into several threads and tasks down to the most granular level. For illustrative purposes, an application Ak can be broken down into a set of subprograms {Pij}, which in FIG. 6 is shown as a process graph. The set of subprograms {Pij} can be arranged in the form of a multilevel graph G, with each node of G being a subprogram Pij.

An application is processed through the random number generator and splitter as follows. The process can be implemented wholly in hardware, or in software—either through the OS kernel space code, or through an OS API layer with a user space code—or through a combination of OS kernel and hardware.

The multilevel graph G illustrated in FIG. 6 is processed by the random number generator 210, where each node is subject to a random operation. Each node Pij is transformed into a randomized node Rij. The {Rij} comprises another multilevel graph G'. This graph G' is processed through the polynomial operations unit 220, where each randomized node Rij is subject to a polynomial arithmetic operation derived at random. For example, node R11 may be subject to a multiplication and shift operation by the polynomial ax2+bx+c, with the degree 2 polynomial being selected at random, as well as the coefficients a, b and c being selected at random. Each randomized node Rij, after the polynomial arithmetic operation, is transformed to a node Tij. The polynomial operations unit 220 can be implemented in hardware, with the degree and coefficient of the polynomials chosen for operation derived from the random number generator 210. They could also be derived independently from a user-defined program. The random number generator 210 and the polynomial operations unit 220 may be implemented together in the same functional block. The assortment of {Tij} is represented as a multilevel graph G'. This is split into multiple sub-graphs {Gij} in the splitter 230, which are then allocated to memory addresses for write operations to fulfil the request for processing the application Ak in the memory allocator 240. The integrity of the nodes of the multiple sub-graphs are checked in the checker 250. From an implementation perspective, this is performed by ensuring that the application metadata is preserved among the nodes of the sub-graphs, which can be constructed back correctly, and the associated data structures, functions and application code can be classified together. Preserving this application metadata is performed with the system memory map. Accordingly, every node of the split sub-graphs contains references to the application system-level dependency, and the application data. This helps in managing computation overheads by reducing system calls upon reading data references and writing flags and instruction sequences using the hardware transactional memory unit 110. The sub-graph optimization and map to the original multilevel graph G of the application Ak is maintained at all times using the application metadata and its references through process-level communications.

The comparator 260 may be implemented as a script running to detect the indicators of compromise. This implementation may be performed at the kernel space level. According to an embodiment, these scripts take the outputs of the nodes of the sub-graphs G" as functional inputs, compare these values with the system profiles of non-compromised applications and output a status as to whether the requested application Ak is compromised or not. The output status can be handled by the hardware transactional memory unit 110 and the other system components as described in FIGS. 1-2. According to an embodiment, the system stores a template system profile for each type of application as it behaves when the application is non-compromised. Given a new application that may or may not be compromised, the system determines the system profile of the new application and compares characteristics of the system profile with the template system profile of a non-compromised application of the same type as stored in the system profile map.

The computing systems unit 100 can be combined with other computing systems units 100 to span an entire organizational IT (information technology) infrastructure covering all the constituent IT assets. An example of a system environment using multiple computing systems units 100 is shown in FIG. 6.

FIG. 6 illustrates a permutation unit interacting with multiple computing systems units, according to an embodiment. The permutation unit 600 interacts with multiple computing systems base units 100a, 100b, 100c, and so on. The permutation unit maintains a data structure comprising the identifier of each computing systems unit 100 together with a reference to the system profile map for the computing systems unit 100. At any given point in time, the permutation unit 600 thus has information on each computing systems base unit's running applications, their system resource dependencies, and the running applications' metadata. The permutation unit 600 thus logically subdivides all the components of an organizational IT infrastructure into a number of computing systems base units. The computing systems base units can change depending on the system's resource use and the number and type of applications running on the system.

According to an embodiment, application programs 610a, 610b, 610c, 610d, 610e, 610f requesting execution on any component of the IT infrastructure are processed by the permutation unit 600 which takes in the application programs 610 to determine one or more computing systems units 100 that those application programs will be assigned to for execution. The permutation unit 600 determines this assignment logic based on the information stored in the permutation unit 600 describing each computing systems unit's state at that given point in time.

According to an embodiment, the permutation unit 600 implements one or more policies based on the information on the system profile map (e.g., available memory space in a computing systems unit 100, types of applications running in a computing systems unit 100, etc.) and the application metadata. The permutation unit 600 may be implemented as a component of the on-chip hardware blocks or implemented as a hardware-software solution using the OS kernel space, the OS APIs calling the kernel space and the on-chip hardware blocks comprising the CPU, Cache, RAM, and Secondary Storage. FIG. 6 illustrates how the permutation unit 600 manages application programs under the condition that the trusted application is not compromised.

Figure 7:
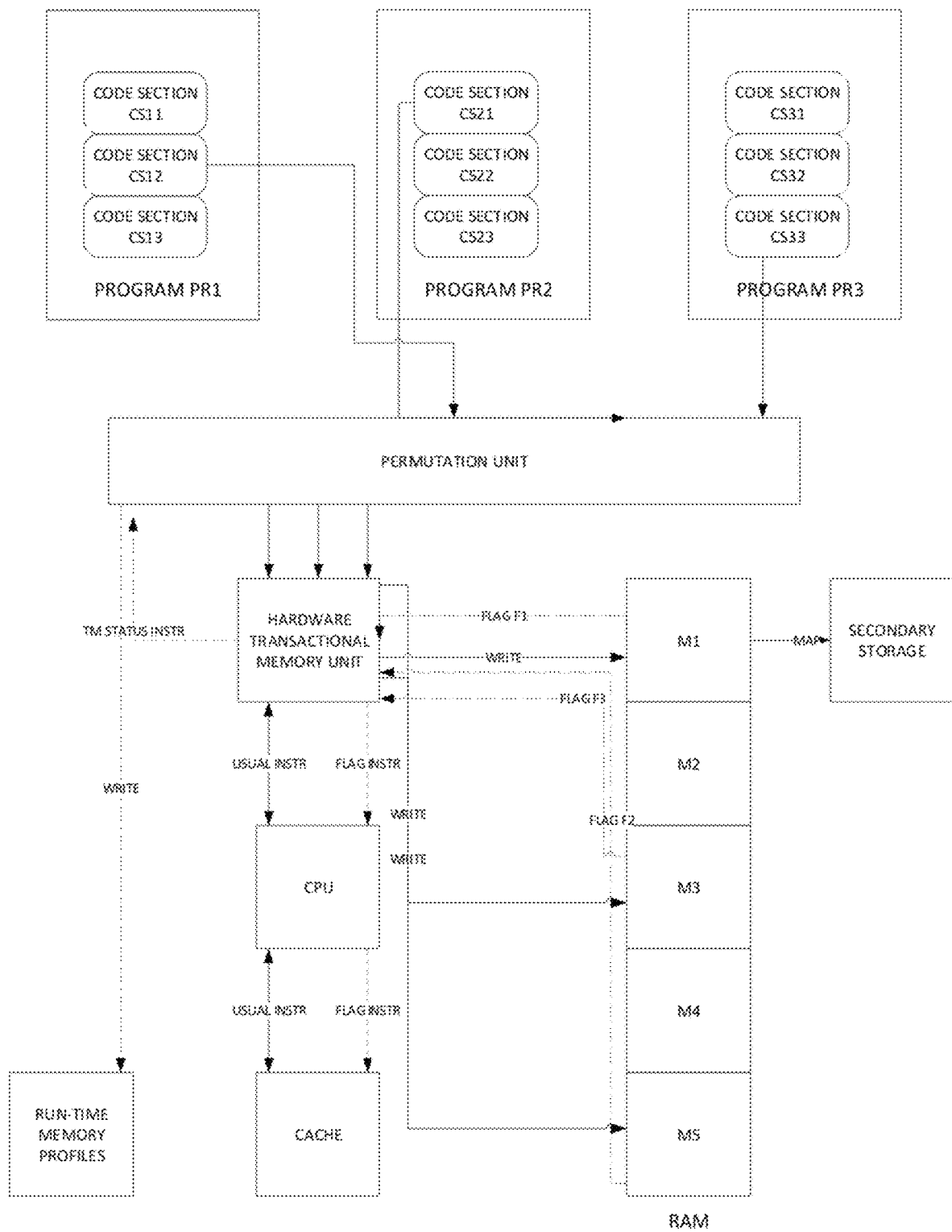
FIG. 7 illustrates managing application requests using the permutation unit and the hardware transactional memory unit for non-compromised trusted applications, according to an embodiment.

Application Ak comprises a set of programs {PRi}, each of which comprises distinct code sections {CSij}. In FIG. 7, for illustrative purposes, both i and j are taken as 3. Accordingly, there are 3 programs corresponding to the requesting application (PR1, PR2 and PR3), and there are 3 code sections in each program (CS11, CS12, CS13; CS21, CS22, CS23; CS31, CS32, CS33). However, the techniques disclosed can be implemented with any number of programs and code sections.

FIG. 7 illustrates managing application requests using the permutation unit and the hardware transactional memory unit for non-compromised trusted applications, according to an embodiment. As illustrated in FIG. 7, the permutation unit 600 and the hardware transactional memory unit 110 functions in conjunction to manage trusted applications that are non-compromised. For example, an application Ak requests resources to run to the permutation unit 600, which assigns it to a particular CSB Block (CSB1) for fulfilling the request. Application Ak comprises a set of programs {PRi}, each of which comprises distinct code sections {CSij}. In FIG. 5, for illustrative purposes, both i and j are taken as 3—which means, there are 3 programs corresponding to the requesting application (PR1, PR2 and PR3), and there are 3 code sections in each program (CS11, CS12, CS13; CS21, CS22, CS23; CS31, CS32, CS33). For illustrative purposes, as shown in FIG. 5, we deal with code sections CS12, CS21 and CS33 that are determined by the permutation unit 600 to be assigned to CSB1. CSB1 comprises the hardware transactional memory unit 110, the CPU, the Cache, the RAM, and the Secondary Storage. Based on CSB1's steady state, at the time the permutation unit 600 receives CS12, CS21 and CS33, the RAM has 5 distinct sections in its address space M1, M2, M3, M4 and M5, with M1 being mapped to a part of the Secondary Storage address space and conducting a swap for availability to service the application's run request. CS12, CS21 and CS33 are processed by the hardware transactional memory unit 110 in accordance with this invention, with each section written into M1, M3 and M5, as shown in FIG. 5. The corresponding flags F1, F2 and F3 are generated and communicated to the hardware transactional memory unit 110 for writes to M1, M3 and M5. The hardware transactional memory unit 110 generates new flags corresponding to F1, F2 and F3, which are sent to the CPU as sequential instructions, triggering the scheduling of the corresponding threads and preparing them ready to be executed. The flags corresponding to F1, F2 and F3, sent to the CPU as sequential instructions, may also be sent to the cache memory based on the condition that the requesting application Ak has already been running on this CSB and has been determined as trusted by the OS. Upon receiving acknowledgements from the cache, and the CPU for the flags, and upon receiving instruction statuses that the writes to M1, M3 and M5 have been completed, the hardware transactional memory unit 110 generates a TM Status instruction to the permutation unit 600, which then generates and communicates a write operation to the Run-Time Memory, allocating system resources for the requested application Ak to complete its run. The hardware transactional memory unit 110, in accordance with this invention, updates the system profile map (as demonstrated in FIG. 1), which in turn, communicates the updated system profile map to the permutation unit 600 (as demonstrated in FIG. 4).

Figure 8:
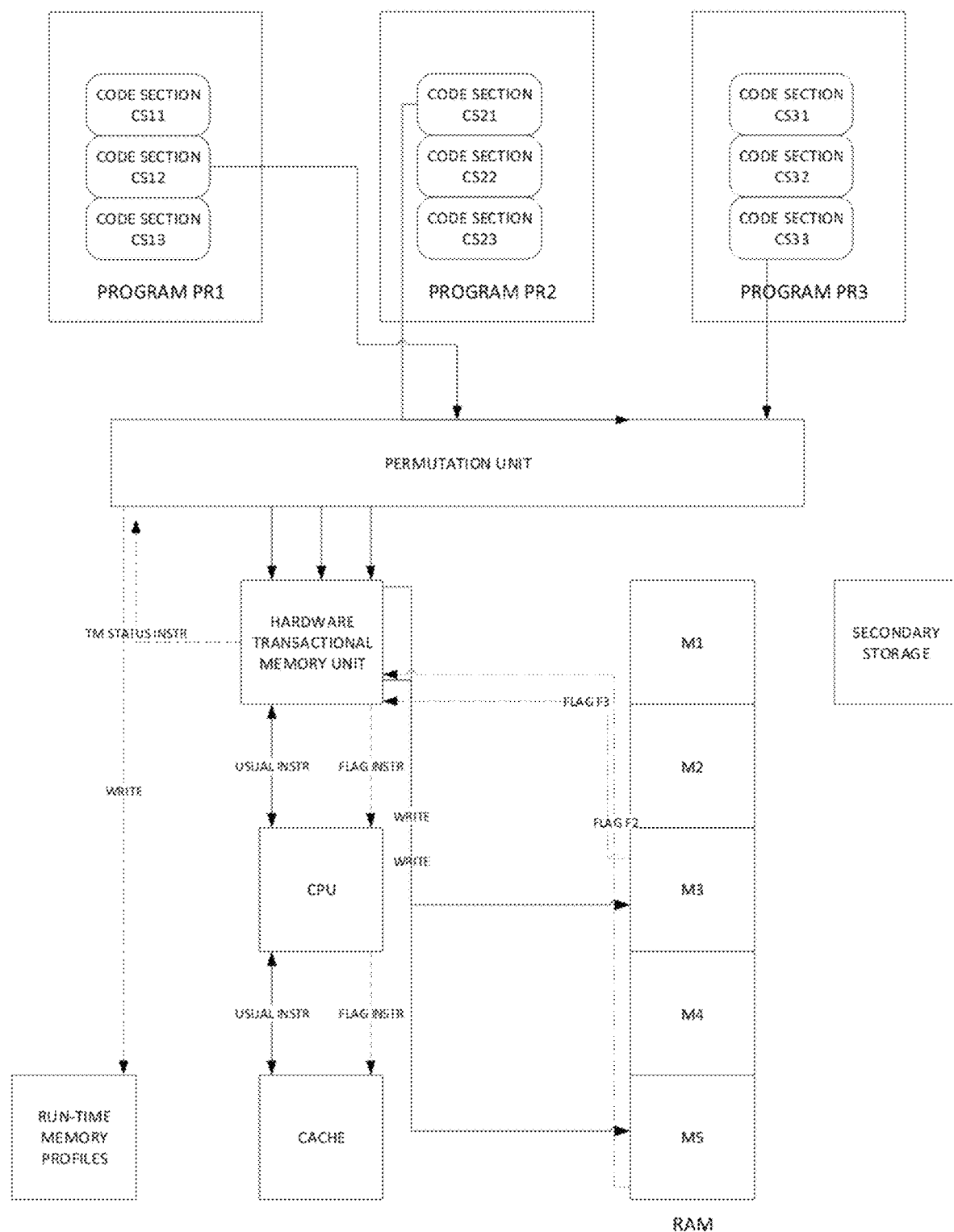
FIG. 8 illustrates managing application requests using the permutation unit and the hardware transactional memory unit for compromised trusted applications, according to an embodiment.
Figure 9:
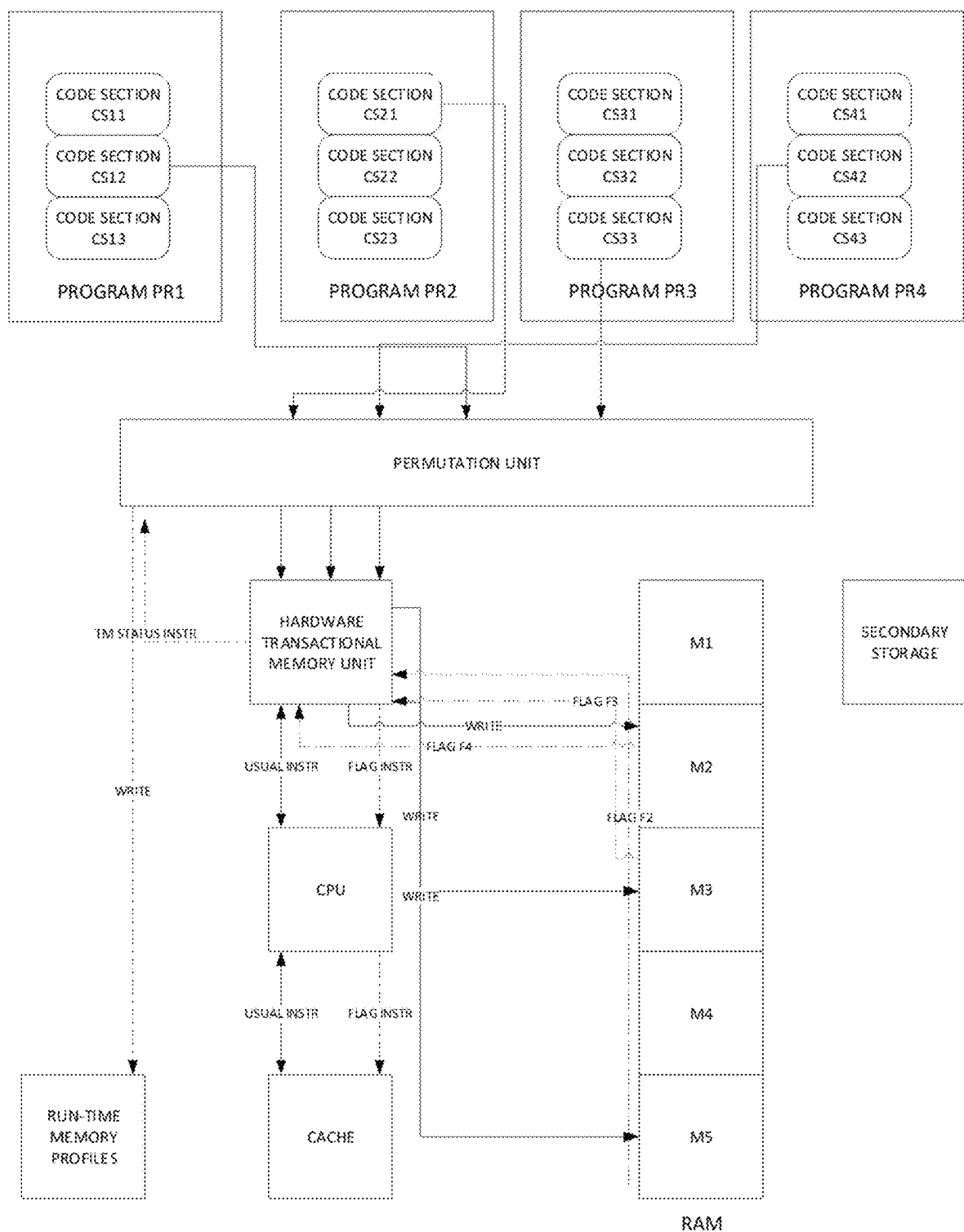
FIG. 9 illustrates managing application requests using the permutation unit and the hardware transactional memory unit for compromised trusted applications and a new non-compromised trusted application of the same type, according to an embodiment.

FIG. 8 illustrates managing application requests using the permutation unit and the hardware transactional memory unit for compromised trusted applications, according to an embodiment. As illustrated in FIG. 9, the permutation unit 600 and the hardware transactional memory unit 110 function in conjunction to manage trusted applications that are compromised. In this example, it is deemed that there is a compromise in CS12. The hardware transactional memory unit 110, in accordance with this invention, processes the request, but there is no system resource allocation done for CS12. There are allocations for CS21 and CS33, but the overall application does not run as CS12 is identified as a compromise and handled by the hardware transactional memory unit 110 in accordance with this invention, as demonstrated in FIGS. 1 and 2. For applications that have independent subroutines, which can run as parallel without affecting the compromised section, those can be run under specific conditions if permitted by the user who receives the alerts from the hardware transactional memory unit 110 upon detection of the compromise. The flags and the sequential instructions as described for FIG. 5 are then allowed to run in a controlled and isolated mode, with an extra instruction being written into the CPU and noting the memory addresses used in the run. This also ensures that the compromised application is unable to affect other code sections of application programs that are currently running, as a result of which, by isolating the compromised application and denying it the required resources to run, the impact of the compromise can be eliminated at inception. FIG. 7 demonstrates how a non-compromised version of an application is handled by the permutation unit 600 once the isolation and handling of a compromised version of the same application is done.

FIG. 9 illustrates managing application requests using the permutation unit and the hardware transactional memory unit for compromised trusted applications and a new non-compromised trusted application of the same type, according to an embodiment. As illustrated in FIG. 9, the permutation unit 600 and the hardware transactional memory unit 110 function in conjunction to manage trusted applications that are compromised, and handle a new trusted application of the same type. In accordance with an embodiment, CS12 is determined to be compromised and isolated. The same application type now requests for processing, with CS42 (being similar to CS12) being assigned by the permutation unit 600 to the hardware transactional memory unit 110 for further processing. Upon determination that this application is not compromised, M2 is allocated for CS42's request. M3 and M5 are unchanged as previously, processing requests for CS21 and CS33 without any interrupts. A new flag F4 is generated and written to the hardware transactional memory unit 110 upon allocation to M2 as shown in FIG. 9. The system now works similar to that described for FIG. 7. The system is able to isolate compromised applications at run-time, but that isolation does not affect future resource allocation requests for applications of the same type, provided the hardware transactional memory unit 110 determines that they are not compromised while processing them at run-time. The method also guarantees that system resources will be allocated to application runs for concurrency in an optimal manner by adopting policy-based implementations derived from application programs at run-time and system profile map changes at run-time.

Protecting Data and IT Infrastructure

An IT infrastructure may have one or more backdoors that represent a security loophole that may be exploited by a malicious actor to gain access to systems and data of an organization. A backdoor is typically not apparent and cannot be detected easily. A system according to an embodiment, continuously scans the IT infrastructure to identify presence of backdoors, so that they can be remedied before the impact of a threat actor becomes significant. The system performs such scans efficiently in terms of security, scalability, and performance. The system identifies backdoors in IT infrastructure and isolates them efficiently and fast involving minimal computational overheads and supporting large, networked topologies.

IT infrastructure is generally built around networked topologies comprising system resources such as processors and on-chip computing units, operating systems (OS), middleware, application software and other types of computing and storage elements. These resources can be instantiated by a user request through the invocation of different computing models (e.g., virtualization, containerization etc.) to provide for performance of different services, applications, processes, or tasks.

Figure 10:
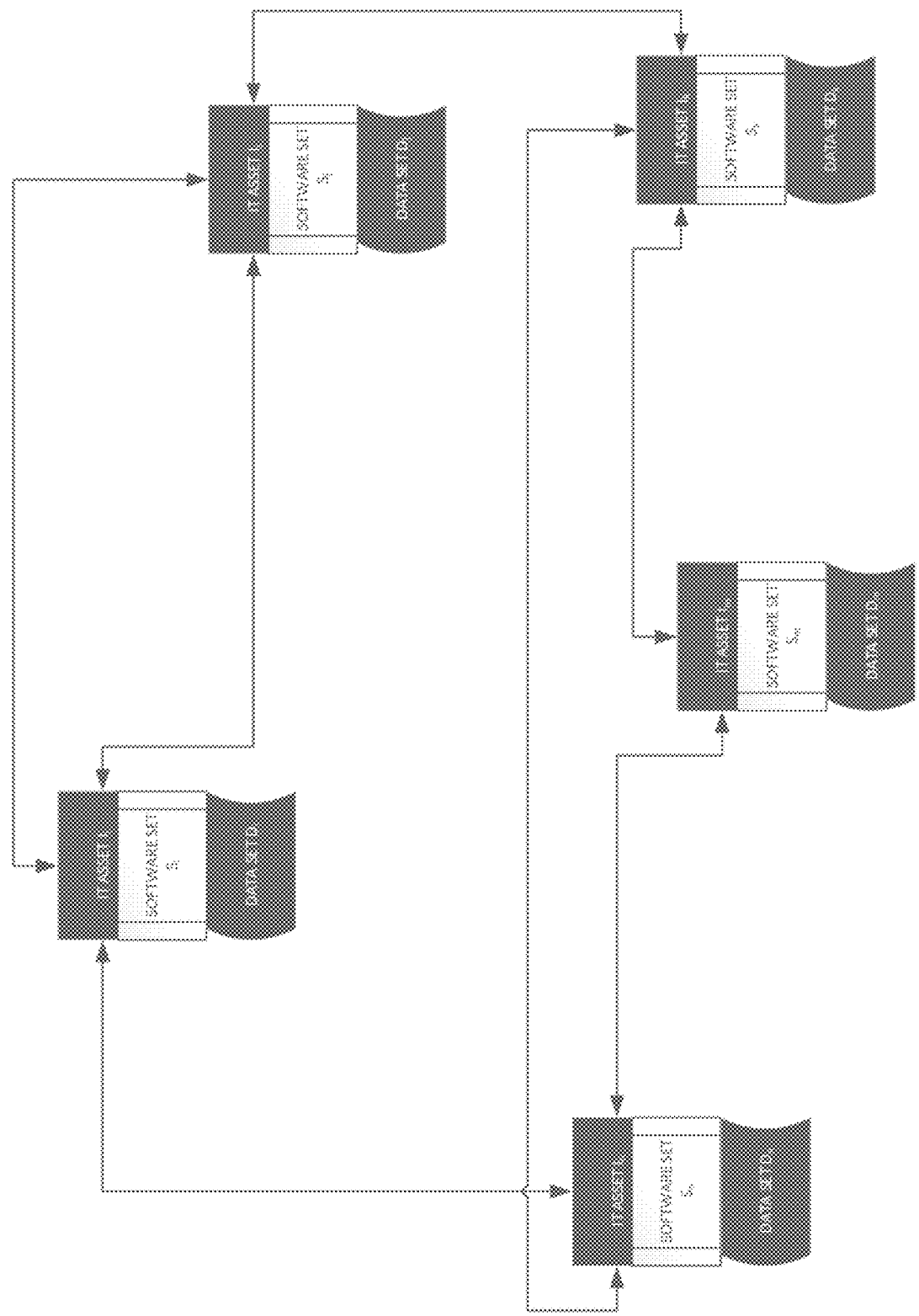
FIG. 10 shows a network topology of IT infrastructure that is managed by the system according to an embodiment.

FIG. 10 shows a network topology of IT infrastructure that is managed by the system according to an embodiment. As shown in FIG. 10, the IT infrastructure includes multiple components of the networked topology. Each component includes an IT Asset, software set and data set. An example of an IT asset is a Windows Server 2019. An example of a software set is SharePoint and Oracle Financials. An example of a data set is electronic data associated with SharePoint and Oracle Financials. The IT infrastructure may be represented as a set of triplets comprising (IT Asset, Software Set and Data Set). Accordingly, an IT infrastructure may comprise any number of assets, software builds and packages executing on those assets, and data used by those software builds and packages.

The system continuously scans across these IT infrastructure components (as shown in FIG. 10) using a crawler and determines where backdoors are present. A backdoor could be present in one or more triplets (IT Asset, Software Set and Data Set).

Figure 11:
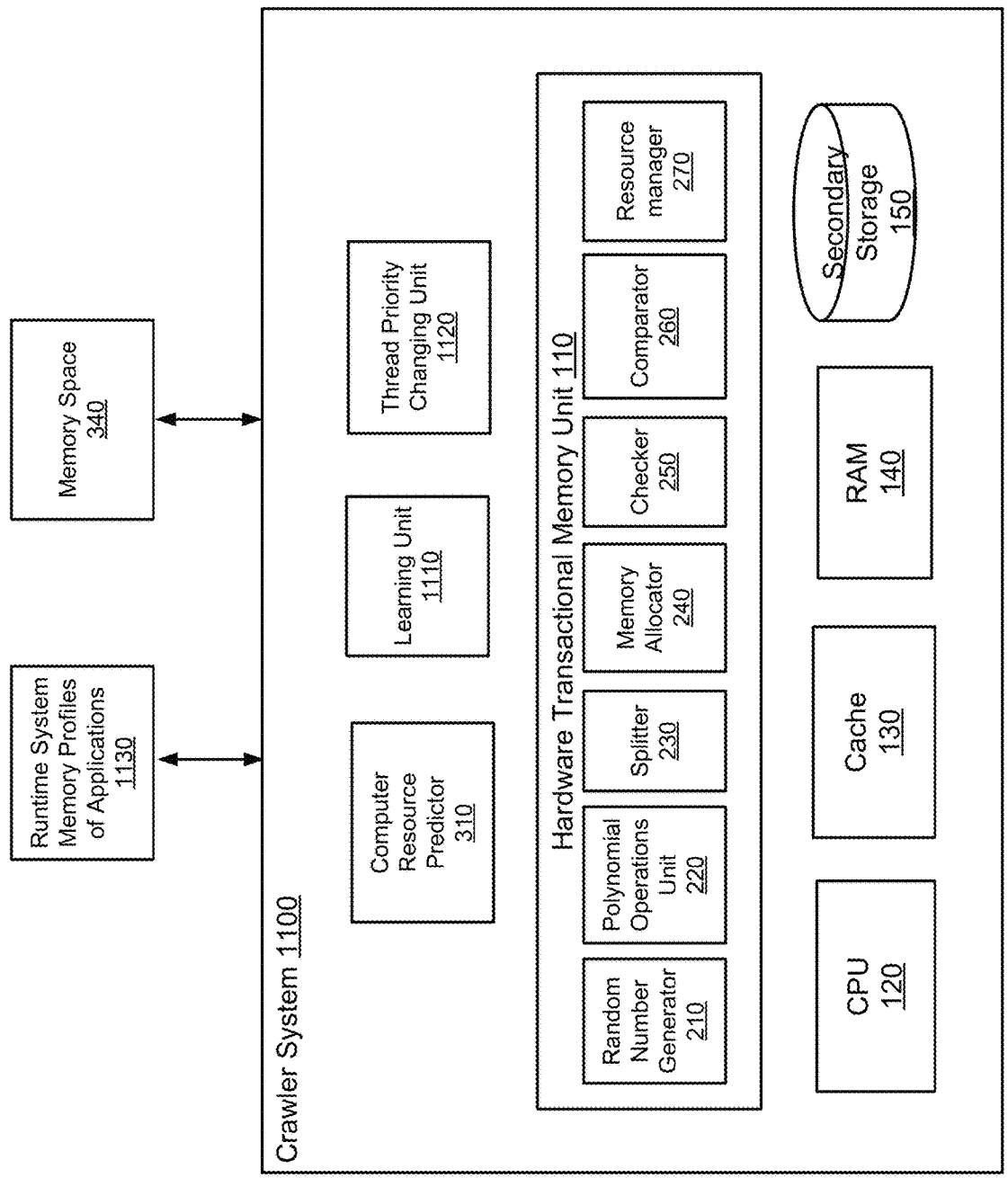
FIG. 11 shows a system environment including a crawler for managing IT infrastructure, according to an embodiment.

FIG. 11 shows a system environment including a crawler for managing IT infrastructure, according to an embodiment. The crawler system 1100 comprises the computing resources predictor 310, a hardware transactional memory unit 110 (with sub-units as shown in FIG. 2), a thread priority changing unit 1120, and a learning unit 1110. The crawler system interfaces with the memory space 340, run-time system memory profiles of applications 1130, and the computing systems unit 110 comprising the CPU, RAM, cache, and secondary storage.

The run-time system memory profile of applications 1130 is implemented as a back-end database containing system-level resource dependency information of applications running on the system (e.g., process information, memory addresses, memory sizes, task information, CPU usage etc.). Any types of system-level resource dependency information may be collected. The system performs the collection continuously over time. This allows the system to analyze at any point in time, the resource load of the system, together with the resource dependencies that enable applications to run and perform. This run-time system memory profile of applications 1130 provide an input to the computing resources predictor 310. The run-time system memory profile of applications 1130 takes the output of the memory space 340.

The hardware transactional memory unit 110 (HTMU) may be implemented as a hybrid combination of operating system (OS) kernel space scripts and messaging instructions from OS to on-chip computing unit through the OS-hardware interface. The random number generator 210 has an output interface to the computing resources predictor 310 and an input interface from learning unit 1110.

At any given point in time, when an application $A_0$ processing request arrives, depending on the system resource load and resource dependencies of the applications running on the system, the computing resources predictor 310 estimates the amount of system resources required by the requested application to run. It sends a message to the random number generator with this estimated value $E_0$ and the type of application requesting processing $T_0$, which generates a set of random numbers $R_1$, and invokes the polynomial operations unit 220.

The polynomial operations unit 220 creates a process graph $P_0$ of the requested application $A_0$ and performs a random polynomial operation on each node of the process graph, thereby creating a transformed process graph $TP_0$. This transformed process graph $TP_0$ is then input to the memory allocator 240, which assigns identifiers Do to each node in system memory (which itself is a process graph derived from $TP_0$), and outputs it to the splitter 230. The splitter 230 partitions the process graph Do to a random number of sub-graphs $SD_0$. Each sub-graph is input to the checker 250, where data integrity checks are performed for each node, before inputting to the comparator 260.

In the comparator 260, the sub-graphs are compared with sub-graphs $C_0$ for the application type $A_0$ that is known to be trusted by the OS and the system by making calls to the database holding the run-time system memory profile of applications 1130. Upon comparison, if there are no variations observed in the sub-graph comparisons, an instruction is sent to the resource manager 270, which then performs a write operation on the memory space 340, which in turns updates the run-time system memory profile of applications 1130 through a flag operational instruction. The comparator 260 sends a flag operational instruction to the thread priority changing unit 1120, which further sends this operational instruction to the learning unit 1110.

In the event the comparison of the sub-graphs $SD_0$ and $C_0$ yield variations, indicating an element of compromise in the requesting application $A_0$, there is no further resource allocated by the system to the requesting application $A_0$. This indicator of compromise is sent as a separate operational instruction to the thread priority changing unit 1120, and on to the learning unit 1110. In the learning unit 1110, the type of compromise is stored using a write instruction. Upon completion of the write instruction, a flag is sent to the random number generator 210, which in turn, sends a message to the computing resources predictor 310, and the requesting application $A_0$ is denied the required computing resources to run. This effectively isolates the compromised application and prevent a cybersecurity breach from happening.

The learning unit 1110 continuously writes the type of compromises within its system component and maintains a local database for this, which in turn, helps in better identification of a compromised application type in the comparator 260. The learning unit 1110 stores characteristics of the compromised application that allow the system to perform early detection of a cybersecurity breach if the same backdoor technique is used again by a malicious actor. For example, if the system determines a particular characteristic of the process graph that acted as an indicator of compromise for detecting that the application was compromised, the learning unit 1110 stores an association between the application and the indicator of compromise as metadata describing a potential security breach. The system may compare the metadata describing the potential security breach with existing metadata stored by the learning unit to make sure that the new metadata is not a duplicate of an existing metadata. For example, the indicator of compromise may indicate that a process created by the application requested access for a resource that is not typical for the application based on the system memory profile of the application. As another example, the indicator of compromise may indicate that the number of threads created by a process exceeded a threshold value if the system memory profile of the application indicates that the number of threads crated by the process of the application is expected to be below a threshold value. As another example, the indicator of compromise may indicate that the process graph structure of the application is different from the structure of the typical process graph created by applications of that type as indicated by the system memory profile of the application. The system memory profile of the application may store structural information of the process graph, for example, if the process graph is a process tree, the structural information may include a typical height of the process tree, a fanout of different levels of the process tree, information describing the set of instructions (e.g., a function, a method, a command, or an API) being executed by a particular process or thread in the process graph, and so on.

According to an embodiment, the information identified by the learning unit describing potential security breaches for various applications is presented to an expert user, for example, a system administrator or a developer. The expert user may determine whether the system generated a false alarm or detected an actual security breach. The user feedback is used to refine the data stored in a learning unit 1110.

According to an embodiment, the knowledge describing various potential backdoors collected by various learning units is combined to generate a repository of the knowledge. The combined knowledge is redistributed to various learning units. As a result, the knowledge available at each learning unit 1110 increases over time based on the potential backdoors detected by the learning unit 1110 as well as by potential backdoors detected by other learning units 1110.

According to an embodiment, the knowledge learnt by the learning unit 1110 or by multiple learning units is represented as a machine learning model. The potential backdoors of compromised applications detected by various learning units as well as then system profiles of applications that are not compromised are used as negative and positive samples respectively and used as training data for training a machine learning model. The machine learning model may be a logistic regression-based model but is not limited to a specific architecture. For example, the machine learning model may be a neural network such as a multilayered perceptron. The machine learning model receives as input an encoding of information describing an application including the process graph, memory allocation information, runtime statistics, and so on. These attributes of an application are provided as features input to the machine learning model as a feature vector. The feature vector may include encoding of the process structure, for example, a linearized representation of the process graph obtained by performing a deterministic traversal of the process graph starting from a root node of the process graph, for example, the first process created by the application. The machine learning model is trained to predict a score indicating a likelihood that the application is compromised. For example, the result of comparison of the predicted score for an application with a threshold indicates whether the application is compromised or not. For example, if the predicted score for an application exceeds the threshold value, the system may determine that the application is compromised and deny any request for resources by the application and issue instructions to kill processed of the application. Similarly, if the predicted score for an application is below the threshold value, the system may determine that the application is not compromised and approve any request for resources by the application and let the application execute.

Continuous instructions handling and management of applications through the HTMU, the thread priority changing unit 1120 and the learning unit 1110 provide a robust system for securely managing IT infrastructure in accordance with this invention. For applications that are running on the system that have been previously identified as trusted and non-compromised, a compromised application of a similar type is efficiently detected so that it does not affect the runs of existing applications.

The thread priority changing unit 1120 holds a local database of all the thread identifiers associated with applications that are running on the system. If there is a compromise detected at the comparator level for this case, the thread priority changing unit 1120 assigns a different priority identifier for threads of the same application type that is compromised before issuing the process kill command. The threads of running applications are not affected. This also prevents obfuscation of existing threads with compromised application threads at run-time. The resource manager of the HTMU does not issue a write instruction to the memory space 340 in this case. The random number generator 210 coordinates with the learning unit 1110 for generating future sets of random numbers while processing new application requests that come in through the computing resources predictor 310.

Figure 12A:
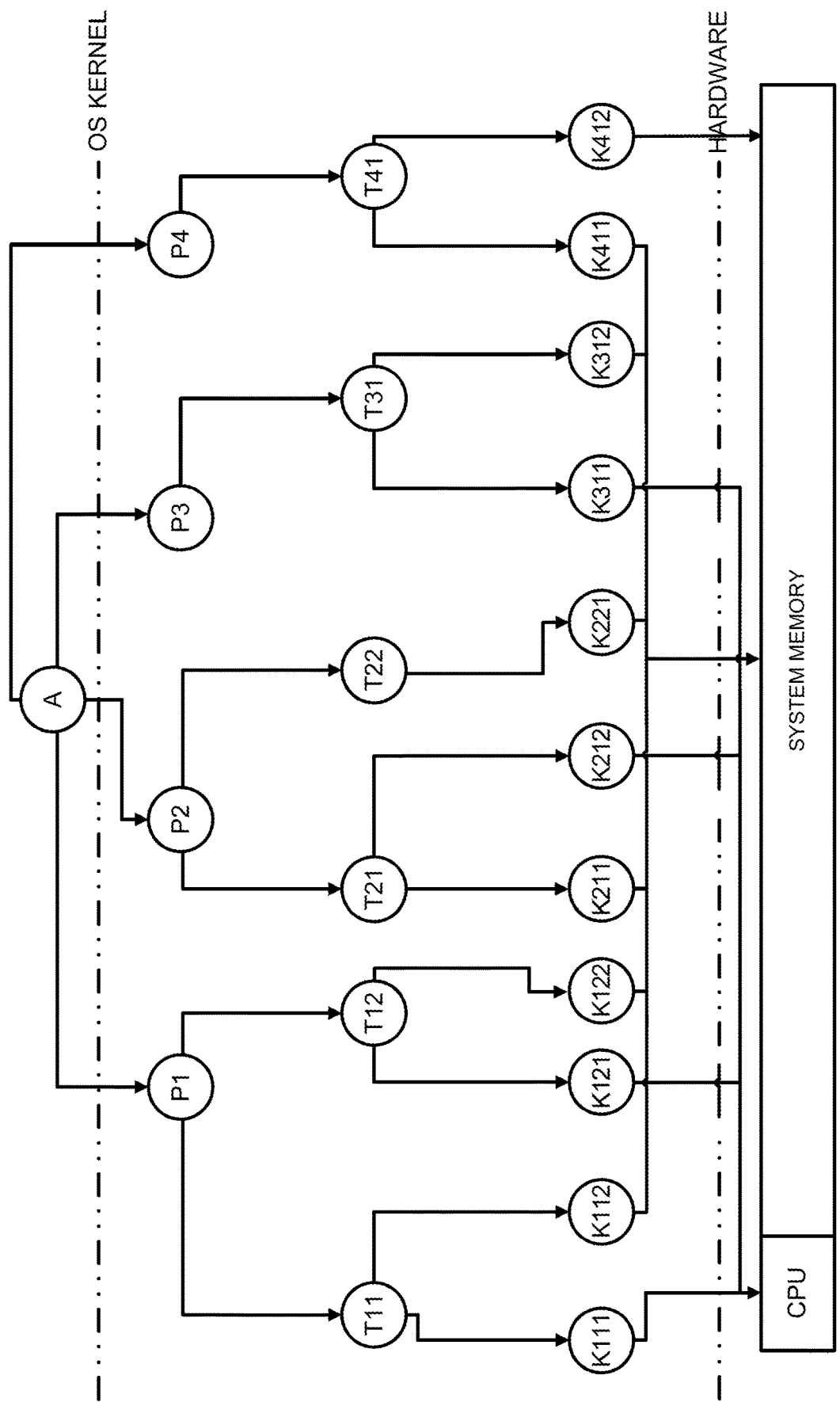
FIG. 12A shows a method for creating a process graph for a trusted application that is not compromised, according to an embodiment.
Figure 12B:
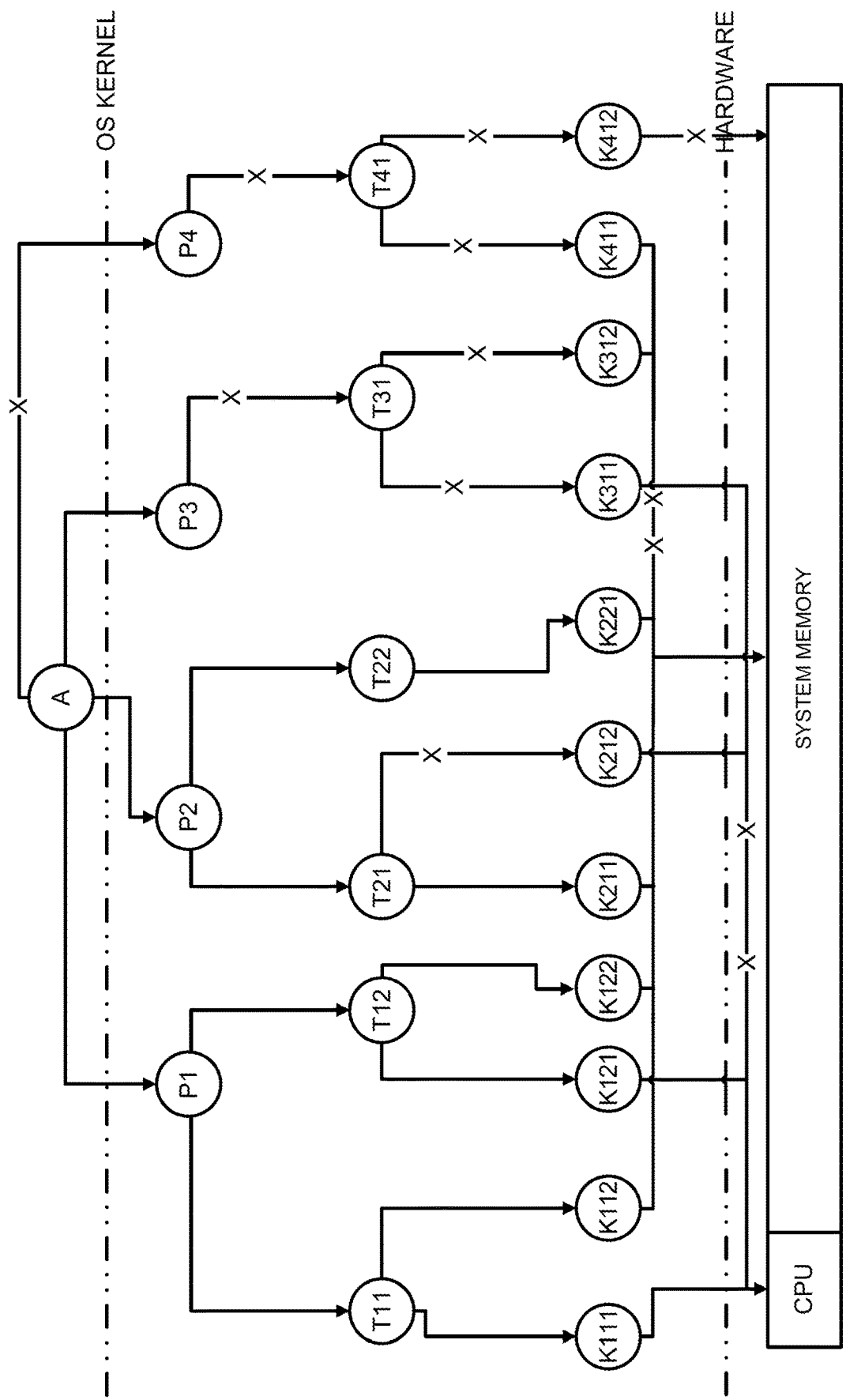
FIG. 12B illustrates creating of a process graph for a trusted application that is compromised, according to an embodiment.

FIG. 12A shows a method for creating a process graph for a trusted application that is not compromised, according to an embodiment.

As shown in FIG. 12A an application is A is first broken down into processes ($P_k$), then threads ($T_{kn}$) and finally tasks ($K_{keen}$) that are assigned to system memory, following the description of the crawler system and its component functions in FIG. 11.

FIG. 12B illustrates creating of a process graph for a trusted application that is compromised, according to an embodiment. Process P4 is identified as a compromise in accordance with this invention.

Figure 13:
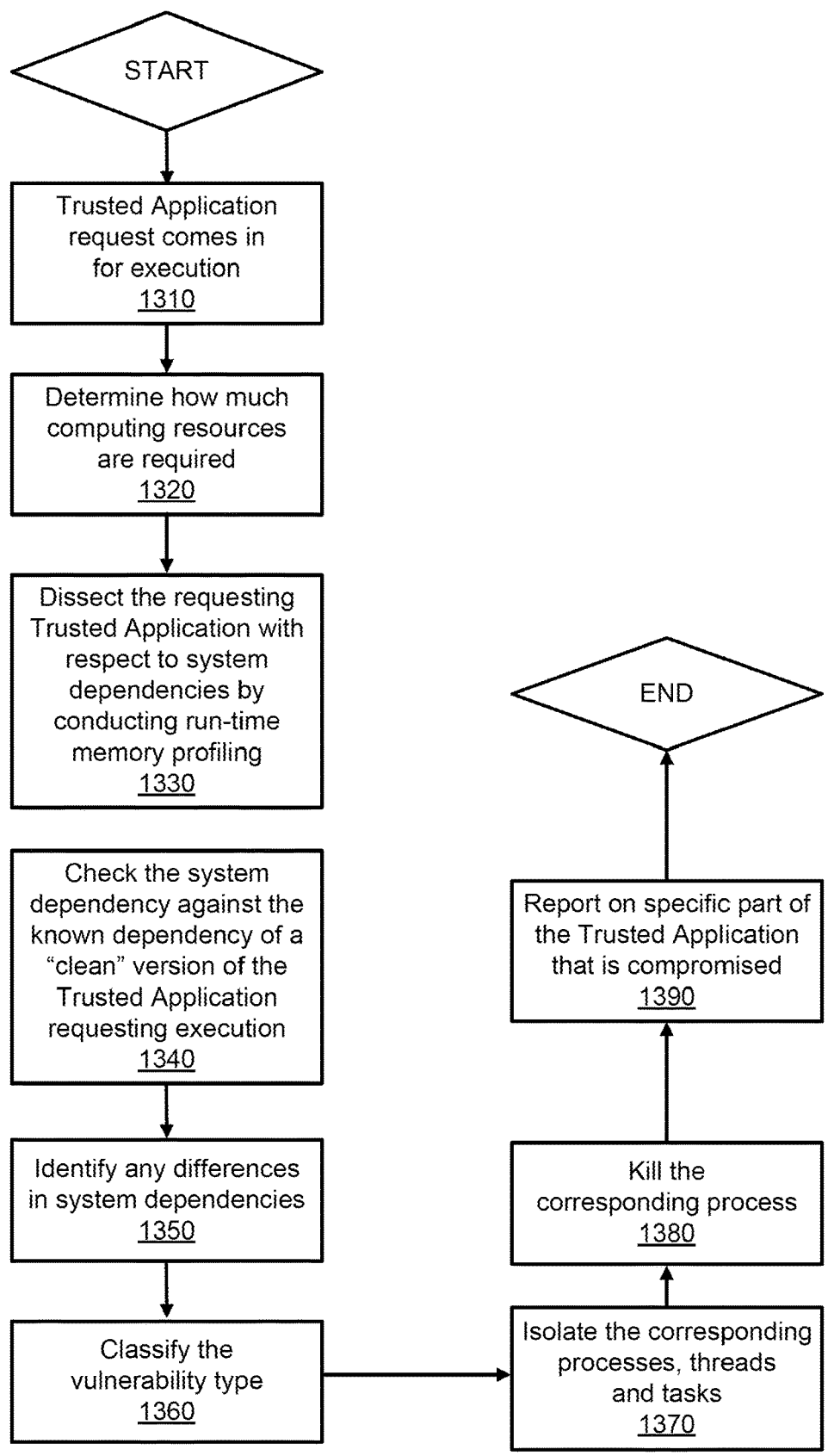
FIG. 13 shows a flowchart illustrating a process executed by a crawler system in accordance with an embodiment of this invention for single system memory architecture devices.

In FIG. 12A and FIG. 12B, the process graphs can be taken as being indicative of a trusted application being non-compromised and then compromised. As described for FIG. 11, the comparator in the HTMU computes the variation in these two process sub-graphs after partition. The comparator detects a difference in process P4, or at any of the sub-graph levels, as shown in FIG. 13, and functions in the way as described for FIG. 11. The compromised trusted application thus does not get the requested resources to run, as a result of which, it cannot run to invoke its intended damage.

FIG. 13 shows a flowchart illustrating a process executed by a crawler system in accordance with an embodiment of this invention for single system memory architecture devices. The steps are described as being performed by a system, for example, the crawler system 1100. The system receives 1310 a request from a new trusted application. The system determines 1320 the amount of resources required for processing the request. Again, this follows how the HTMU architecture works as in FIG. 3. The crawler in FIG. 11 incorporates the HTMU and the amount of resources determined is in conjunction with the computing systems predictor and the random number generator. The system analyzes 1330 requesting trusted application by conducting run-time profiling of the application to determine various system dependencies for the application. System dependencies represent the system resources needed by a requesting application at run-time. Accordingly, system dependencies of a requesting application are the associated processes, tasks, threats and hardware instructions that go with fulfilling its request for resource allocation to run. System dependencies also include the sequence of process creation, system calls, sequence of generated tasks, sequence of threads scheduled to run on the CPU and the hardware instructions to allocate dynamic memory for completing the run. The system dependency of a requesting application comprises a process graph traversed in sequence, top-to-bottom each node and branch-wise. Accordingly, the system determined a system profile map for the new trusted application. The system compares 1340 the system profile map of the new trusted application against known system profile maps of trusted applications of the same type that are known to have been not compromised. Known applications of the same type may represent applications executed using the same executable file or set of files. The system compares the system dependencies represented by the system profile maps of the new application against known applications. The system identifies 1350 any differences in the system profile map and the corresponding system dependencies between the new trusted application and known uncompromised applications of the same type. If the system identifies differences between the new trusted application and known uncompromised applications based on comparison of their system profile maps, the system classifies 1360 the vulnerability type. The vulnerability type is classified based on the run-time behavior of the threat actor, its exploitation nature, the areas of the target system that it affects, the key deviations in process graph that it generates. The system further isolates 1370 the processes and threads of the new trusted application. The system kills 1380 the processes and threads of the new trusted application expect for processes and threads that are shared with other uncompromised applications. The system reports 1390 information describing the causes of the compromise of the new trusted application, for example, by describing the differences between the system profile map of the new trusted application and system profile map of corresponding uncompromised trusted applications.

Figure 14:
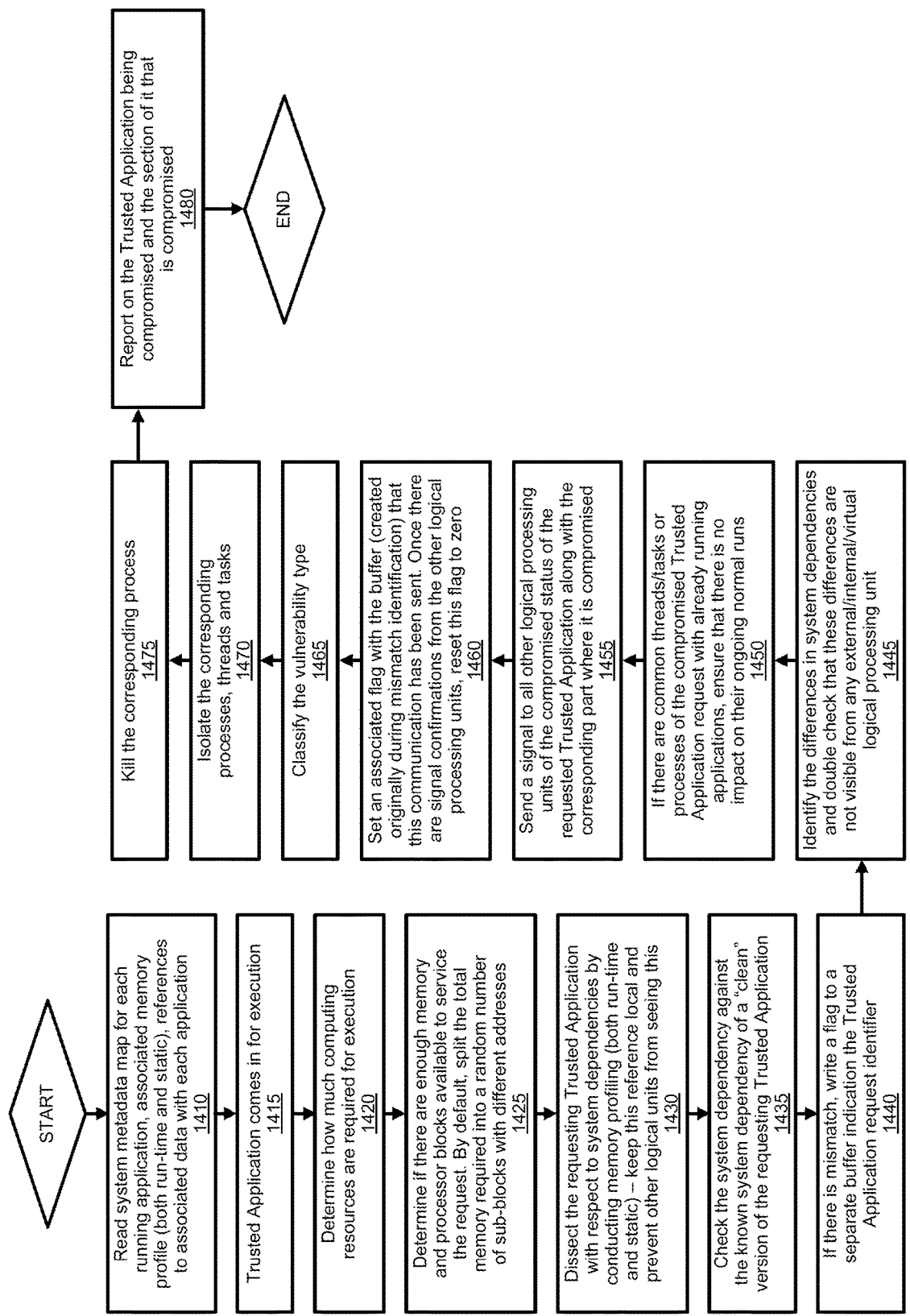
FIG. 14 illustrates the crawler workflow in accordance with this invention for single system memory architecture devices.

FIG. 14 illustrates the crawler workflow in accordance with this invention for single system memory architecture devices. The steps are described as being performed by a system, for example, the crawler system 1100. This class of devices can be present in one or more networked topology nodes as shown in FIG. 10. The system reads 1410 the system profile map for each running application in the system. The system receives 1415 a new trusted application for execution. The system determines 1420 the amount of computing resources required for execution of the new trusted application. The system determines 1425 is there are sufficient memory and processor blocks available to process the received request. The system splits the total memory required for running the new trusted application into a plurality of sub-blocks at different memory addresses. The sub-blocks may be randomly determined using the random number generator. The system analyzes 1430 the new trusted application with respect to system dependencies by conducting memory profiling and generating a system memory profile for the new trusted application. The system stories this information locally so that other system units are unable to access this information. The system compares 1435 the system dependencies stored in the system memory profile of the new trusted application with system dependencies stored in a system profile map of a known uncompromised application of the same type. If the system identifies 1440 a mismatch the system writes a flag to a buffer indicating the new trusted application is compromised. The system identifies 1445 the differences in system dependencies stored in the system memory profile of the new trusted application with system dependencies stored in a system profile map of a known uncompromised application of the same type. If the system identifies common threads or processes of the new trusted application that are also used by uncompromised applications, the system ensures that these threads/processes are not impacted. The system sends 1455 a signal to other logical processing units of the system indicating that the new trusted application is compromised and provides information describing the compromise. The system sets 1460 an associated flag with the buffer indicating that this information has been sent and resets the flag if the other logical units confirm that they received the information. The system classifies 1465 the vulnerability types. The system isolates the processes and threads of the new trusted application that are not shared with other uncompromised applications. The system kills the identified processes and threads. The system may generate a report on the trusted application being compromised and the portion of the trusted application that is being compromised.

Figure 15:
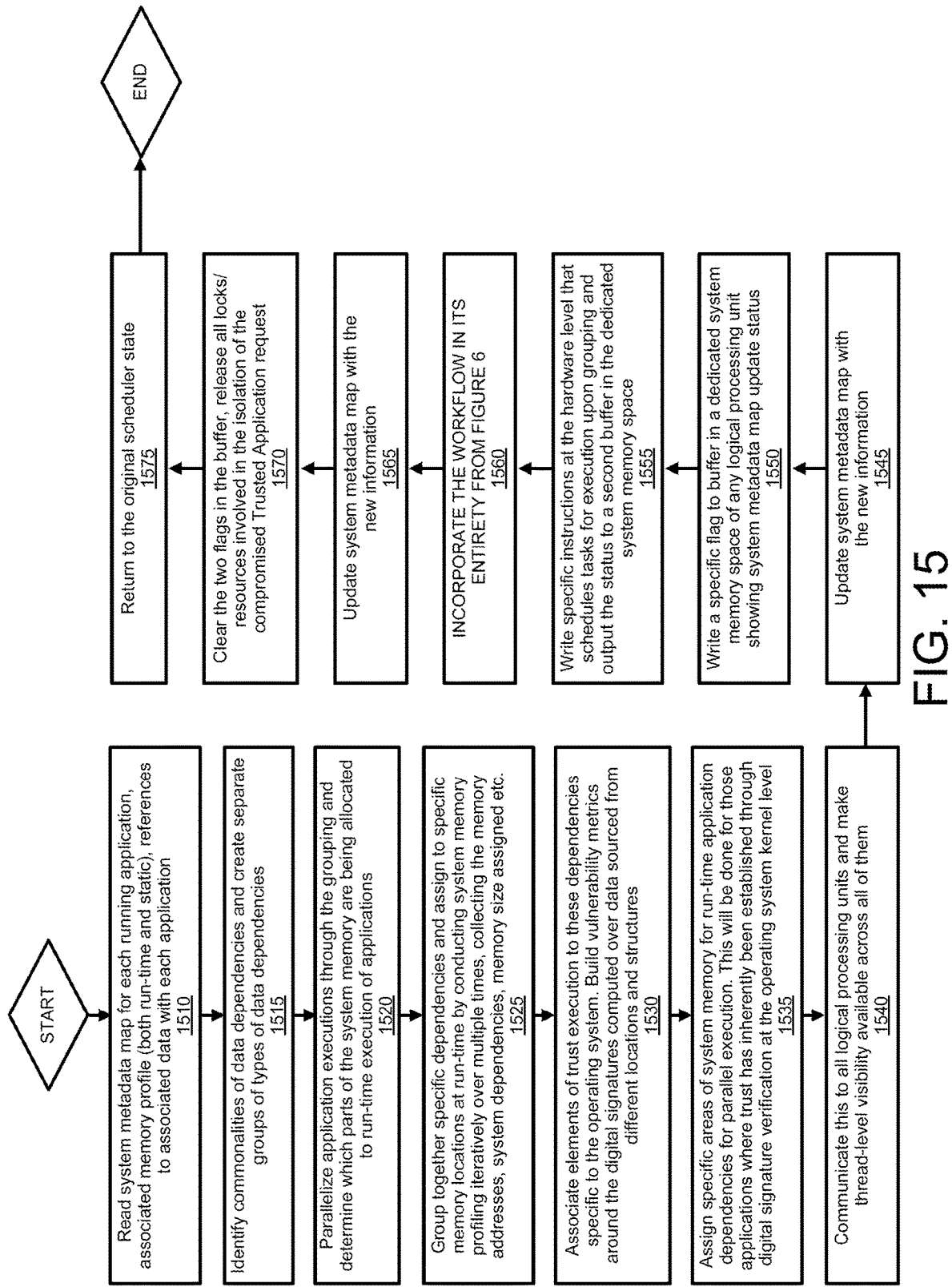
FIG. 15 illustrates the crawler workflow in accordance with this invention for shared memory system architecture devices using hardware transactional memory unit.

FIG. 15 illustrates the crawler workflow in accordance with this invention for shared memory system architecture devices using hardware transactional memory unit. The steps are described as being performed by a system, for example, the crawler system 1100. This class of devices can be present in one or more networked topology nodes as shown in FIG. 10.

Datasets associated with different IT assets, as shown in FIG. 10, may be referenced through virtual machine system configuration using the HTMU as described in the crawler system shown in FIG. 11. IT assets can be standalone servers; servers connected with one or more workstations; laptops; client machines; cloud computing infrastructure; smartphones; iPads; etc. On each IT asset, one or more software builds and packages can be installed, or executed, or supported. The crawler parses through kernel level data and underlying hardware configurations to determine backdoors and points of vulnerability through the HTMU, the thread priority changing unit 1120 and the learning unit 1110, as shown in FIG. 11 and described as part of the crawler system. Backdoors can typically be thus: a software installed on an IT asset has an execution exception for a specific type of input data; a configuration on an IT asset port enables remote access to it and leads to possible system administrator compromise; a file system event compromise in the OS kernel that allows exploitation of trusted application run-time execution etc. Often security patches are applied to a part of an organization's IT infrastructure without understanding if that introduces a backdoor/exposes any other part of the IT Infrastructure to future attacks. The crawler addresses this problem. Post scan completion, the crawler outputs an identifier with a metadata map that comprises the details of the identified backdoor (e.g., there is a bug associated with Software Set 3 installed on Asset Set 3, there is a trapdoor associated with Software Set 7 that runs on Asset Set 7, there is a suspicious data block in Data Set 5 residing on Asset Set 5). This information is analyzed further, while understanding the value of the data and IT asset to the organization corresponding to each identified vulnerability. As business continuity is a key objective to maintain in organizations, these identified vulnerabilities, their associated data and IT asset control is indexed and collected in the logical pairing of identifier and metadata map against the crawler scan runs. Several crawlers can be run on the organization's IT infrastructure to better identify backdoors efficiently. All these crawlers can also communicate with one another in real-time upon configuration. The crawler thus demonstrates to the organization the points of vulnerability in its IT infrastructure and ensures that the associated data and IT assets are protected against incidents. The crawler thus helps to create a reference to the associated data and IT assets which can potentially be moved to different storage locations in a random manner. This randomness is driven for each identifier and metadata map pair from the underlying OS kernel and system hardware conditions. If an incident compromises the IT infrastructure, in-part or in-whole, retrieving and recovering the affected data and IT asset configurations would be quick and efficient. In certain embodiments, the crawler can also enable actual data to be referenced and protected in a cost-effective manner, particularly proving efficient for high volumes of data stored across multiple storage units in an organization (including on-premises, cloud, and encrypted backup solutions).

Random Number Generation as a Service

The system according to various embodiments uses random number generator for performing various operations such as determining an expected size of memory for an application and for splitting the memory into multiple sub-blocks of memory. Typical random number generators often generate random numbers in a predictable manner. As a result the algorithms followed by such systems become predictable, making it easier to malicious actors to find backdoors in the system.

The random number generator 210 implements a true random number generator that is distinct from a pseudo-random number generators. A system may be able to predict the numbers generated by a pseudo-random number generator but is not able to predict random numbers generated by a true random number generated. The random number generated by the random number generator 210 do not include any identifiable patterns. The random number generator 210 may be used as a service, acting as Random Number Generator-as-a-Service (RNGaaS). The random number generator 210 can be used for various applications such as encryption/decryption keys, PKI security, secure messaging and communications etc. The random number generator 210 integrates various entropy sources in the process of random number generation. An entropy source provides random numbers that are used to generate a seed that is further used by the random number generator 210 for generating random numbers. The random number generator 210 generates true random numbers and is cryptographically secure, fast, undegradable, and easy to adapt and deploy in real-world solutions. The random number generator 210 generates random numbers that cannot be predicted in contrast to pseudo-random numbers generated by conventional system. A malicious actor may be able to monitor random numbers generated by a pseudo-random number generator over a period of time, for example, hours, days, or even years and determine certain pattern in the random numbers being generated. The malicious actor may be able to exploit the predictability of the random numbers as a security vulnerability. In contrast, the random number generator 210 according to various embodiments generates true random numbers that provide higher degree of security and is therefore a technical improvement over conventional random number generators in the field of security and cryptography and helps prevent cyberattacks on systems.

Figure 16:
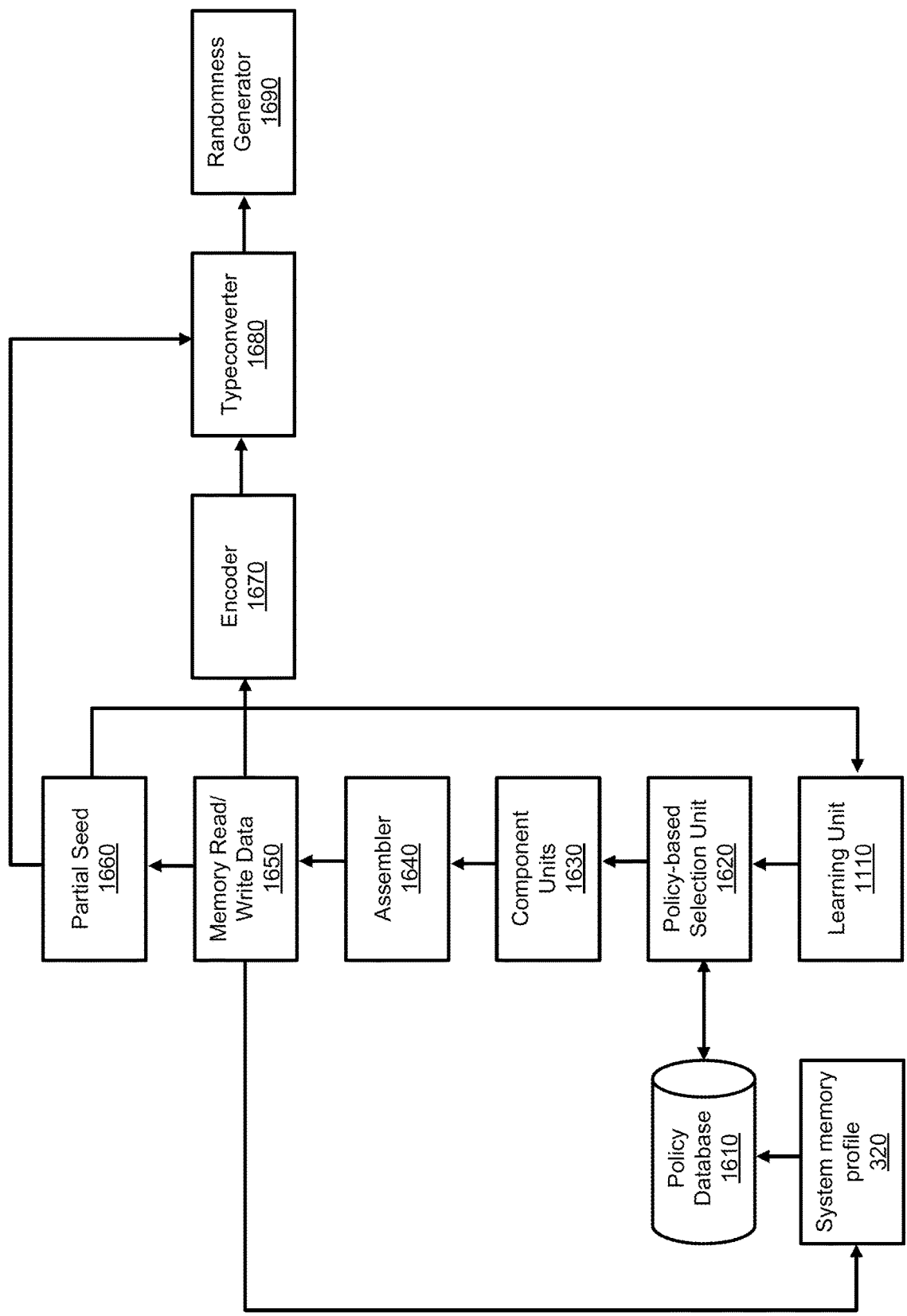
FIG. 16 illustrates a system architecture of a random number generator according to an embodiment.

FIG. 16 illustrates a system architecture of a random number generator according to an embodiment. The system uses multiple components of various computing systems units as entropy sources that can be used for obtaining random numbers that act as seeds for further creating random numbers. An example of an entropy source is a CPU of a computing system unit from which CPU % utilization is extracted as random values for use as seeds. Another example of an entropy source is memory of a computing system unit from which RAM usage is extracted as random values for use as seeds. Another example of an entropy source is virtual memory of a computing system unit from which virtual memory statistics is extracted as random values for use as seeds. Another example of an entropy source is a register such that the system extracts a value stored in the register at any point in time and uses that as a seed. The system may generate a seed from a set of keys pressed by a user on a keyboard of a device.

The system memory profile 320 may be implemented as a script that resides in the kernel space of the device's operating system. This script contains information of the device's system state in real-time, as in, the measures of parameters such as CPU % utilization, virtual memory statistics, RAM usage and so on. Any device internal parameter's continuous measurement at any given point in time can be sourced in this script. This block interfaces with a policy database 1610, which is a database that is implemented in the user space of the device's operating system.

The policy database 1610 is implemented as a database of records of various policies that drive the system's optimal resource allocation based on its system state and the set of applications running on it. For example, if at a given point in time, the system state shows that the L1 cache is full, and a swap is necessary with a memory block in secondary storage, a resource allocation policy is enforced that prevents invoking any cache read/write access at that point in time. The policies also typically look at regions in system memory (both static and dynamic) to assign areas of resource allocation for seed generation, if a request would arrive from the policy-based selection unit 1620. A policy may determine a set of entropy sources that are used for generating seeds for use in generating random numbers.

The resource allocation of policies affects the entropy source selection. For example, if the L1 cache is full, generally its components will not be sourced for entropy generation in that timestamp iteration. Though this causes a bit of bias—however the policy ensures that there's enough granularity and number of choices for entropy generation source selection. In a virtual machine or container configuration, if one physical or logical system's L1 cache is full, it can access any other machine's L1 cache if necessary. To generate true random numbers, the system selects multiple entropy generators, leverages on their generated partial seeds, and performs mathematical operations on them to make sure that the finally generated random number is unpredictable, cryptographically strong, cannot be re-engineered quickly, or determined from side-channel attacks (typically by observing the process of the random number generation from outside or inside).

The policy-based selection unit 1620 may be implemented as a software module within the user and kernel space of the device's operating system. The policy-based selection unit 1620 requests inputs from the policy database 1610 once it receives a request from the learning unit 1110, which is a module implemented in the device's system hardware. The learning unit 1110 is implemented as a group of register blocks that are automatically read and written once an output from the partial seed 1660 is received successfully, the write flag being invoked on success of a write of the partial seed to the RAM. The learning unit 1110 maintains the trueness of the random number generated at all times and prevents degradation of the quality of random numbers generated using multiple devices on a continuous basis.

Initially, the policy database 1610 outputs a specific policy to the policy-based selection unit 1620, which then invokes the component units 1630. The component units 1630 are units that are logically separate from one another and form the basis of multiple sources of entropy generation. For example, a set of component units 1630 would be a random number generation library block, a software module comprising data inputted by a user on the device (e.g., keystroke data), a software module comprising data collected from the device's underlying interconnects, a software module comprising data collected from the device's ambient surroundings (e.g., temperature) et. al. The component units 1630 also include an assorted set of polynomial operators of different degrees and coefficients. These may be configured uniquely or generated on the fly.

Initially, upon receiving a policy from the policy database 1610, the policy-based selection unit 1620 invokes the component units 1630, which results in different polynomial operators being assigned at random to different data blocks drawn in from one or more of the blocks comprising the component units 1630. The data block represents values generated by an entropy source that is used for seed generation. These data blocks are then passed on to the assembler 1640, which is a hybrid unit implemented in hardware and user space of the device's operating system, that further permutes and combines the outputs of the polynomial operations undertaken in the component units 1630. The permutation and combination in the assembler 1640 invokes direct read and write operations to the RAM, and once this permutation and combination is completed, the outputs are written to the RAM. The flags of these output writes, along with the relevant identifier addresses where the writes are done in the RAM, are then passed onto the partial seed block 1660. One output of this partial seed block 1660 is fed into the learning unit 1110, which stores the information into its registers and uses that for future comparison with the information coming out of the partial seed block 1660, checking for variations in statistical independence, cryptographically strong status and the like before invoking the policy-based selection unit 1620. The system according to various embodiments checks whether the values generated by different entropy sources are independent of each other and uncorrelated with each other. If the system determines that two entropy sources are correlated with each other, the system stops using one of the sources and selects a different entropy source. The system also checks if a particular entropy source generates values that are unpredictable. Accordingly, the system monitors correlation between sets of values generated by the entropy source and different points in time. If the system determines that an entropy source generates values that are predictable since the values generated at different points in time are correlated, the system avoids using that entropy source. The system tests random number independence and unpredictability at the time of entropy source selection and seed generation.

A section of the learning unit registers is programmed with different statistical tests of true randomness, as well as tests derived out of a set of standard guidelines on statistical tests for random and pseudorandom number generators. The learning unit 1110 thus maintains the trueness of the random number generated for all runs.

An output of the partial seed block 1660 goes to the type converter 1680 block, which is a software module block comprising character type transformation instructions. The encoder 1670 is a software module block comprising coding algorithms implemented in the user space of the device's operating system. The encoder 1670 takes inputs from the RAM, accessing the data by reference of the output writes of the assembler 1640. In the encoder 1670, coding takes place of the computation outcome generated from the partial seed 1660, and metadata in the form of the assembler 1640 output writes are attached to the codes, which then are passed to the type converter 1680, where character transformation completion takes place before the random number is generated in the randomness generator 1690 block. The type conversion prevents re-engineering as well as deducing the random numbers by observation/inference. Encoding the seeds through type conversion helps increase the degree of randomness.

The output of the randomness generator 1690 block thus comprises a coded and transformed version of the permuted and combined outcomes of the device's multiple internal and external entropy sources that are referenced through addresses written for these operations in the RAM at runtime. Once this is done, the system memory profile block is updated, which then updates the policy database 1610, and in conjunction with the learning unit 1110, maintains trueness of random numbers generated at all times.

Figure 17:
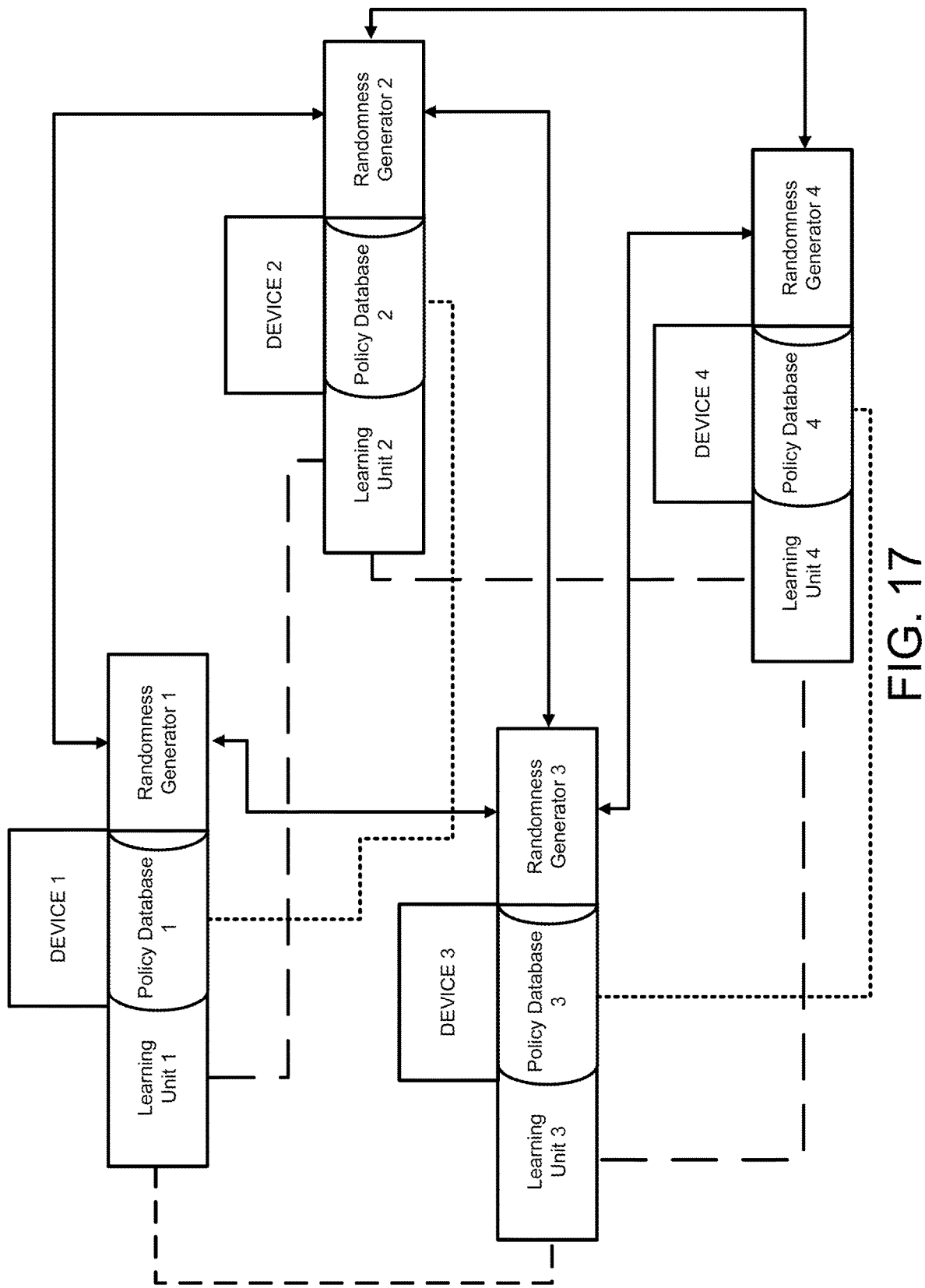
FIG. 17 illustrates a random number generator as a service extended for multiple devices, according to an embodiment.

FIG. 17 illustrates a random number generator as a service extended for multiple devices, according to an embodiment.

As illustrated in FIG. 17, randomness generation can take place across multiple devices. This configuration is typically for shared-memory systems, separate devices that are either connected in a peer-to-peer manner, devices that may be part of virtual memory systems, containers or hybrid memory systems. The randomness generator 1690 blocks of the devices directly reference one another in generating the final random number to be used for the requested computation outcome. There is also logical referencing between the individual device learning units 1110 and the policy databases 1610, ensuring that the final random number generated across the devices is always true. The devices, when collaboratively computing the final random number, also reference each other's learning units 1110 as embodied, and maintain the policy profile for each device referenced so that inherently, each device's choices of the component units 1630 in terms of entropy sources and the related polynomial operators assist in choosing the optimal cryptographically strong and statistical independent outputs of the partial seed blocks 1660.

This forms the basis of realizing the RNGaaS, which can be realized in various embodiments of this invention. The RNGaaS is typically realized as the output of the randomness generator 1690 unit of each device, or the outputs of several of those devices, either in a peer-to-peer network configuration, or in a shared-memory configuration, or in a virtual machine, container or a hybrid memory system configuration.

The RNGaaS can be used to source different applications such as encryption/decryption keys, PKI security, secure messaging and communications systems etc.

Figure 18:
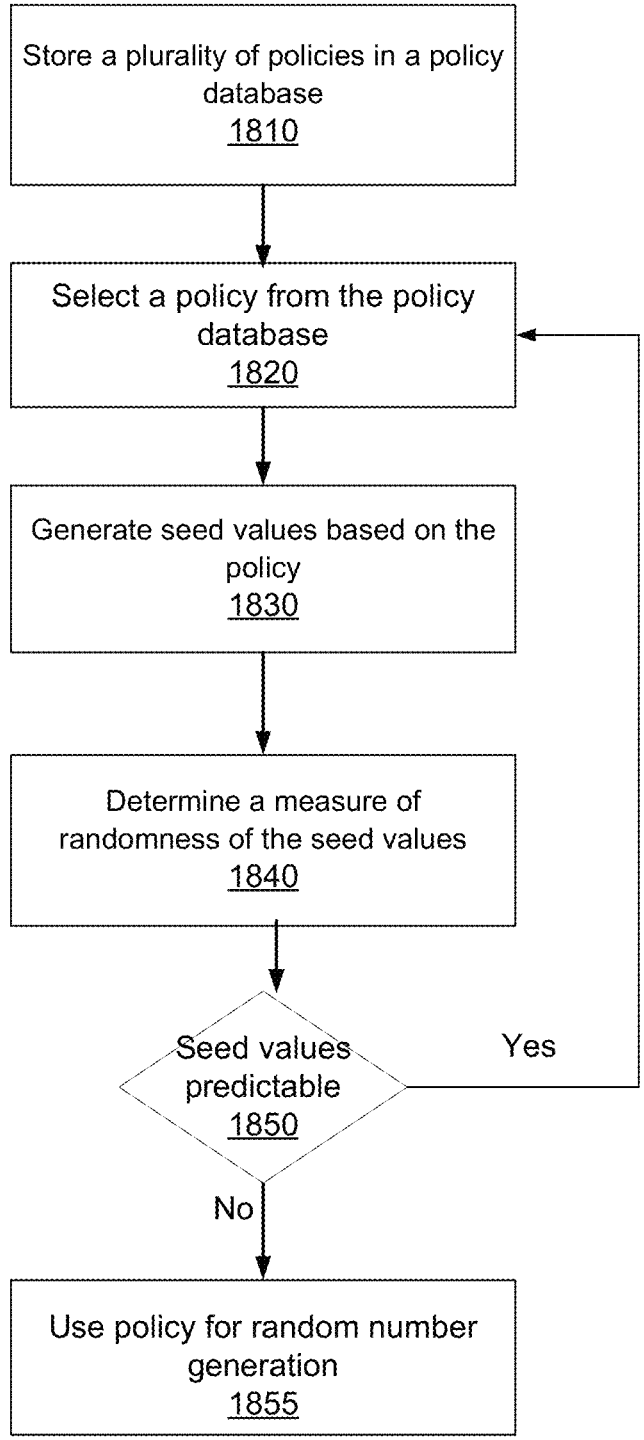
FIG. 18 shows a flowchart illustrating the overall process of true random number generation according to an embodiment.

FIG. 18 shows a flowchart illustrating the overall process of true random number generation according to an embodiment. The steps of the process are described as being implemented by a system and may be executed by the various modules shown in FIG. 16.

The system stores 1810 a set of policies for true random number generation. A policy specifies a set of component units that act as sources of random data values. The policy may specify functions or expressions used to process the data values generated by the component units. The functions or expressions may comprise operators applied to the data values, for example, polynomial operators. The policy may specify a permutation or combination applied to the data values obtained from the component units. The policy may specify a function or expression applied for combining the data values obtained from the component units to generate seed values. The system uses the seed values to generate random numbers.

The system selects 1820 a policy from the policy database. The system may select the policy randomly. The system generates 1830 seed values based on the policy. The component units generate different values at different point in time. For example, the CPU unitization of a CPU changes over time or the memory utilization of a RAM changes over time. Accordingly, the system regenerates the seed values by extracting new values from the components at different points in time, for example, periodically.

The system monitors the quality of seed values generated based on a policy. According to an embodiment, the system determines a measure of randomness of the seed values. The system may determine a measure of randomness by taking different sets of values and determining whether they are correlated. The system may determine a randomness quality score as the measure of randomness. For example, the system may take two sets of values obtained from a component unit at different points in time and determine a measure of correlation between them. The system may system may take a set of values from one component unit and another set of values from another component unit and determine whether the two sets are correlated. If the system identifies statistical correlation between two sets of values the system assigns low value of a measure of randomness of seed values generated based on that policy. The measure of randomness of a policy is continuously monitored and determined. For example, over time the system may determine a correlation between sets of values used for generation of seeds and decrease the randomness quality score for the policy. According to an embodiment, the randomness quality score is determined as an aggregate value based on scores indicating correlation between different sets of values associated with the policy as described herein. The system may determine measure of correlation and use an average measure of correlation as the randomness quality score. The system may use the measure of correlation indicating the worst correlation as a randomness quality score. A measure of correlation is worse than another measure of correlation if it indicates high correlation between two sets of values. Accordingly, the randomness quality score is inversely correlated with the measure of correlation between sets of values associated with seed generation based on a policy.

If the randomness quality score for a policy indicates 1850 a low quality of randomness thereby indicating a high predictability of the random values generated based on the policy, the system determines that the random values generated based on the policy are not true random values. The system stores the randomness quality score of different policies in the policy database to determine which policy to use in future. If the system determines that a policy being used has low randomness quality score, the system selects 1820 a different policy from the policy database and repeats the steps 1830 and 1840. During this process the system continues generating random numbers based on the policy selected. A policy that is determines to have high randomness quality score is used more often for generating random numbers although the system randomly changes the policy used for random number generation to be able to continuously evolve and generate new policies.

The system keeps adding new policies for the policy database and evaluating them. A policy determined to have low randomness quality score has low chance of being selected for use. Accordingly, policies are ranked based on randomness quality score for use for generating random numbers. New policies that are generated have a higher chance of selection so they can be evaluated. According to an embodiment, policies are evaluated in a test or staging environment and promoted to a production environment if they are determined to have high randomness quality score.

According to an embodiment, the system uses an evolution based technique for generating new policies. For example, the system maintains an evolving population of policies. A genetic algorithm may be used for maintaining the evolving population of policies. For example, new policies may be generated by making changes to existing policies (referred to as mutation operation) or by combining attributes of different policies (referred to as a crossover operation). For example, the system may modify one or more attributes of a policy such as by replacing a component unit with another component unit, adding a component unit, removing a component unit, and so on. The system may modify one or more attributes of a policy by changing an operator used for modifying the data values generated by a component unit. The system may modify one or more attributes of a policy by changing the permutation performed of the data values generated by different component units. The system may modify one or more attributes of a policy by changing the expression or function used to combine different data values obtained from component units to determine a seed value. The system may obtain new policy by exchanging attributes two different polices. For example, a component unit C1 used by policy P1 may be switched (exchanged with) with a component unit C2 used by a policy P2. Alternatively, if the same component unit is used by two policies, the system may switch the operators used by the two policies for processing the data values generated by the component units. Similarly, the system may exchange the expression used for combining data values generated by component units used by two policies. The system continuously evaluates the polices generated by using the policy and determining the randomness quality score of each policy. If the randomness quality score of a policy falls below a threshold value, the policy is eliminated from the population. As a result, the overall randomness quality score of the polices if the population improves and the quality of the overall population evolves and improves over time.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method comprising:
   storing a plurality of policies in a policy database, wherein a policy identifies a particular set of component units from one or more computer systems, each component unit generating data values used for generating seed values for generating random numbers;
   selecting from the policy database, a policy identifying a set of component units;
   generating a set of seed values based on the policy, comprising:
      receiving data values generated by each of the set of component units,
      combining the data values received from the set of component units to generate a seed value, and
      using the seed value to generate random numbers;
   determining a randomness quality score of seed values generated using the policy, the randomness quality score determined based on one or more statistical properties associated with the set of seed values; and
   responsive to determining that the randomness quality score of seed values generated using the policy indicates a quality that is below a threshold value, selecting a different policy from the policy database.

2. The computer-implemented method of claim 1, wherein a policy further specifies an operation used for modifying data values generated by a component unit.

3. The computer-implemented method of claim 1, wherein a policy further specifies an expression for combining data values generated based on multiple component units.

4. The computer-implemented method of claim 1, wherein a policy further specifies an expression for generating a permutation of data values generated by different component units.

5. The computer-implemented method of claim 1, wherein the randomness quality score is based on a measure of correlation between sets of data values obtained from two different component units.

6. The computer-implemented method of claim 1, wherein the randomness quality score is based on a measure of correlation between sets of data values obtained from a component unit at different points in time.

7. The computer-implemented method of claim 1, wherein the randomness quality score is inversely related to a degree of correlation between sets of data values used for generating seed values.

8. The computer-implemented method of claim 1, wherein a random number generated is used as an estimate of an amount of memory to be allocated for executing an application.

9. The computer-implemented method of claim 1, further comprising, generating new policies and adding to the policy database, wherein a new policy is generated by modifying one or more existing policies by changing one or more attributes of the policy, wherein an attribute represents a component unit, an operator applied to data values of a component unit, an expression for combining data generated by component units, or a permutation of data values generated by a component unit.

10. A non-transitory computer readable storage medium storing instructions that when executed by one or more computer processors cause the one or more computer processors to perform steps comprising:
    storing a plurality of policies in a policy database, wherein a policy identifies a particular set of component units from one or more computer systems, each component unit generating data values used for generating seed values for generating random numbers;
    selecting from the policy database, a policy identifying a set of component units;
    generating a set of seed values based on the policy, comprising:
       receiving data values generated by each of the set of component units,
       combining the data values received from the set of component units to generate a seed value, and
       using the seed value to generate random numbers;
    determining a randomness quality score of seed values generated using the policy, the randomness quality score determined based on one or more statistical properties associated with the set of seed values; and
    responsive to determining that the randomness quality score of seed values generated using the policy indicates a quality that is below a threshold value, selecting a different policy from the policy database.

11. The non-transitory computer readable storage medium of claim 10, wherein a policy further specifies an operation used for modifying data values generated by a component unit.

12. The non-transitory computer readable storage medium of claim 10, wherein a policy further specifies an expression for combining data values generated based on multiple component units.

13. The non-transitory computer readable storage medium of claim 10, wherein a policy further specifies an expression for generating a permutation of data values generated by different component units.

14. The non-transitory computer readable storage medium of claim 10, wherein the randomness quality score is based on a measure of correlation between sets of data values obtained from two different component units.

15. The non-transitory computer readable storage medium of claim 10, wherein the randomness quality score is based on a measure of correlation between sets of data values obtained from a component unit at different points in time.

16. The non-transitory computer readable storage medium of claim 10, wherein the randomness quality score is inversely related to a degree of correlation between sets of data values used for generating seed values.

17. The non-transitory computer readable storage medium of claim 10, wherein a random number generated is used as an estimate of an amount of memory to be allocated for executing an application.

18. The non-transitory computer readable storage medium of claim 10, further comprising instructions that cause the one or more computer processors to generate new policies and adding to the policy database, wherein a new policy is generated by modifying one or more existing policies by changing one or more attributes of the policy, wherein an attribute represents a component unit, an operator applied to data values of a component unit, an expression for combining data generated by component units, or a permutation of data values generated by a component unit.

19. A computer system comprising:
   one or more computer processors; and
   a non-transitory computer readable storage medium storing instructions that when executed by the one or more computer processors cause the one or more computer processors to perform steps comprising:
      storing a plurality of policies in a policy database, wherein a policy identifies a particular set of component units from one or more computer systems, each component unit generating data values used for generating seed values for generating random numbers;
      selecting from the policy database, a policy identifying a set of component units;
      generating a set of seed values based on the policy, comprising:
         receiving data values generated by each of the set of component units,
         combining the data values received from the set of component units to generate a seed value, and
         using the seed value to generate random numbers;
      determining a randomness quality score of seed values generated using the policy, the randomness quality score determined based on one or more statistical properties associated with the set of seed values; and
      responsive to determining that the randomness quality score of seed values generated using the policy indicates a quality that is below a threshold value, selecting a different policy from the policy database.

20. The computer system of claim 19, further comprising instructions that cause the one or more computer processors to generate new policies and adding to the policy database, wherein a new policy is generated by modifying one or more existing policies by changing one or more attributes of the policy, wherein an attribute represents a component unit, an operator applied to data values of a component unit, an expression for combining data generated by component units, or a permutation of data values generated by a component unit.

* * * * *